(12) United States Patent
Riabtsev et al.

(10) Patent No.: US 11,396,452 B2
(45) Date of Patent: Jul. 26, 2022

(54) METHOD FOR PREPARING LITHIUM CONCENTRATE FROM LITHIUM-BEARING NATURAL BRINES AND PROCESSING THEREOF INTO LITHIUM CHLORIDE OR LITHIUM CARBONATE

(71) Applicant: Ecostar-Nautech Co., Ltd., Novosibirskaia oblast (RU)

(72) Inventors: Aleksandr Dmitriyevich Riabtsev, Novosibirsk (RU); Natalya Pavlovna Kotcupalo, Novosibirsk (RU); Valeriy Ivanovich Titarenko, Novosibirsk (RU); Larisa Timofeyevna Menzheres, Novosibirsk (RU); Elena Viktorovna Mamylova, Novosibirsk (RU); Aleksandr Aleksandrovich Kurakov, Novosibirsk (RU); Nikolay Mikhaylovich Nemkov, Novosibirsk (RU); Andrey Aleksandrovich Kurakov, Novosibirsk (RU); Sergei Aleksandrovich Antonov, Novosibirsk (RU); Elizaveta Petrovna Gushchina, Novosibirsk (RU)

(73) Assignee: ECOSTAR-NAUTECH CO., LTD., Novosibirsk (RU)

( * ) Notice: Subject to any disclaimer, the term of this patent is extended or adjusted under 35 U.S.C. 154(b) by 423 days.

(21) Appl. No.: 16/605,127

(22) PCT Filed: Apr. 13, 2018

(86) PCT No.: PCT/RU2018/050041
§ 371 (c)(1),
(2) Date: Oct. 14, 2019

(87) PCT Pub. No.: WO2018/190754
PCT Pub. Date: Oct. 18, 2018

(65) Prior Publication Data
US 2021/0139339 A1       May 13, 2021

(30) Foreign Application Priority Data

Apr. 14, 2017 (RU) .......................... RU2017113039

(51) Int. Cl.
*B01J 47/02*       (2017.01)
*C01D 15/04*       (2006.01)
*C01D 15/08*       (2006.01)

(52) U.S. Cl.
CPC .............. *C01D 15/04* (2013.01); *B01J 47/02* (2013.01); *C01D 15/08* (2013.01); *C01P 2006/80* (2013.01)

(58) Field of Classification Search
CPC . C01D 15/04; C01D 15/08; C01F 5/24; C01F 11/181; C01F 5/14; B01J 45/00;
(Continued)

(56) References Cited

U.S. PATENT DOCUMENTS 4,159,311 A    6/1979  Lee et al.
4,221,767 A    9/1980  Lee et al.
(Continued)

FOREIGN PATENT DOCUMENTS

CL       44210       6/2004
CL       53829       6/2013
(Continued)

OTHER PUBLICATIONS

Y. I. Ostroushko, T. V. Degtyareva Hydromineral raw material is a sustainable lithium source. Analytical review. TSNIATOMINFORM, 1999, 64 p.
(Continued)

*Primary Examiner* — Timothy C Vanoy
(74) *Attorney, Agent, or Firm* — Calfee Halter & Griswold LLP

(57) ABSTRACT

A method for preparing lithium concentrate from natural lithium-bearing brines was developed. The brine is first
(Continued)

subjected to purification from the suspended solids, then filtered through a static layer of a granulated sorbent based on $LiCl \cdot 2Al(OH)_3 \cdot mH_2O$, where m=3-5, to obtain a primary lithium concentrate. The process is carried out in sorption-desorption units consisting of 4 columns, two of which are in the process of sorption of lithium chloride from the brine, one column is in the process of washing the sorbent saturated with lithium chloride from the brine, and one column is in the process of lithium chloride desorption. The primary lithium concentrate is converted to a secondary lithium concentrate by concentration in evaporative pools or reverse osmotic concentration-desalination. The secondary lithium concentrate is used for further production of lithium chloride or lithium carbonate.

19 Claims, 11 Drawing Sheets

(58) Field of Classification Search
CPC ........ B01J 47/02; B01J 39/07; C01P 2006/80; C01P 2006/82; C22B 3/20; C22B 3/24; C22B 3/44; C22B 7/006; C22B 26/12
See application file for complete search history.

(56) References Cited

U.S. PATENT DOCUMENTS

| | | | |
|---|---|---|---|
| 4,243,392 A | 1/1981 | Brown et al. | |
| 4,271,131 A | 6/1981 | Brown et al. | |
| 4,274,834 A | 6/1981 | Brown et al. | |
| 4,347,327 A | 8/1982 | Lee et al. | |
| 4,477,367 A | 10/1984 | Burba, III | |
| 5,219,550 A | 6/1993 | Brown et al. | |
| 5,389,349 A | 2/1995 | Bauman et al. | |
| 5,599,516 A | 2/1997 | Bauman et al. | |
| 6,207,126 B1 | 3/2001 | Boryta et al. | |
| 7,157,065 B2 | 1/2007 | Boryta et al. | |
| 2012/0141342 A1 | 6/2012 | Alurralde et al. | |
| 2018/0245180 A1* | 8/2018 | Cheng | B01J 20/28004 |

FOREIGN PATENT DOCUMENTS

| | | | | |
|---|---|---|---|---|
| CL | 58136 | | 6/2013 | |
| CL | 201502830 | | 9/2016 | |
| CN | 1 558 871 A | * | 12/2004 | ............. B01J 49/53 |
| RU | 1531388 C | | 11/1994 | |
| RU | 2223142 C2 | | 2/2004 | |
| RU | 2455063 C2 | | 7/2012 | |
| RU | 2516538 C2 | | 8/2013 | |
| RU | 2543214 C2 | | 2/2015 | |
| SU | 1588712 A1 | | 8/1990 | |
| WO | 03037794 A1 | | 5/2003 | |
| WO | 03041857 A1 | | 5/2003 | |
| WO | WO 2012 163 791 A1 | * | 12/2012 | ............. C01D 15/04 |

OTHER PUBLICATIONS

N. P. Kotsupalo, A A. D. Ryabtsev. Chemistry and technology of obtaining lithium compounds from lithium-bearing hydromineral raw material, publ. by Geo, Novosibirsk, 2008, 291 p.

Office action from Chile Application No. 2018-000938 dated May 26, 2020 with machine translation.

Office action from Chile Application No. 2018-000938 dated Nov. 16, 2020 with machine translation.

* cited by examiner

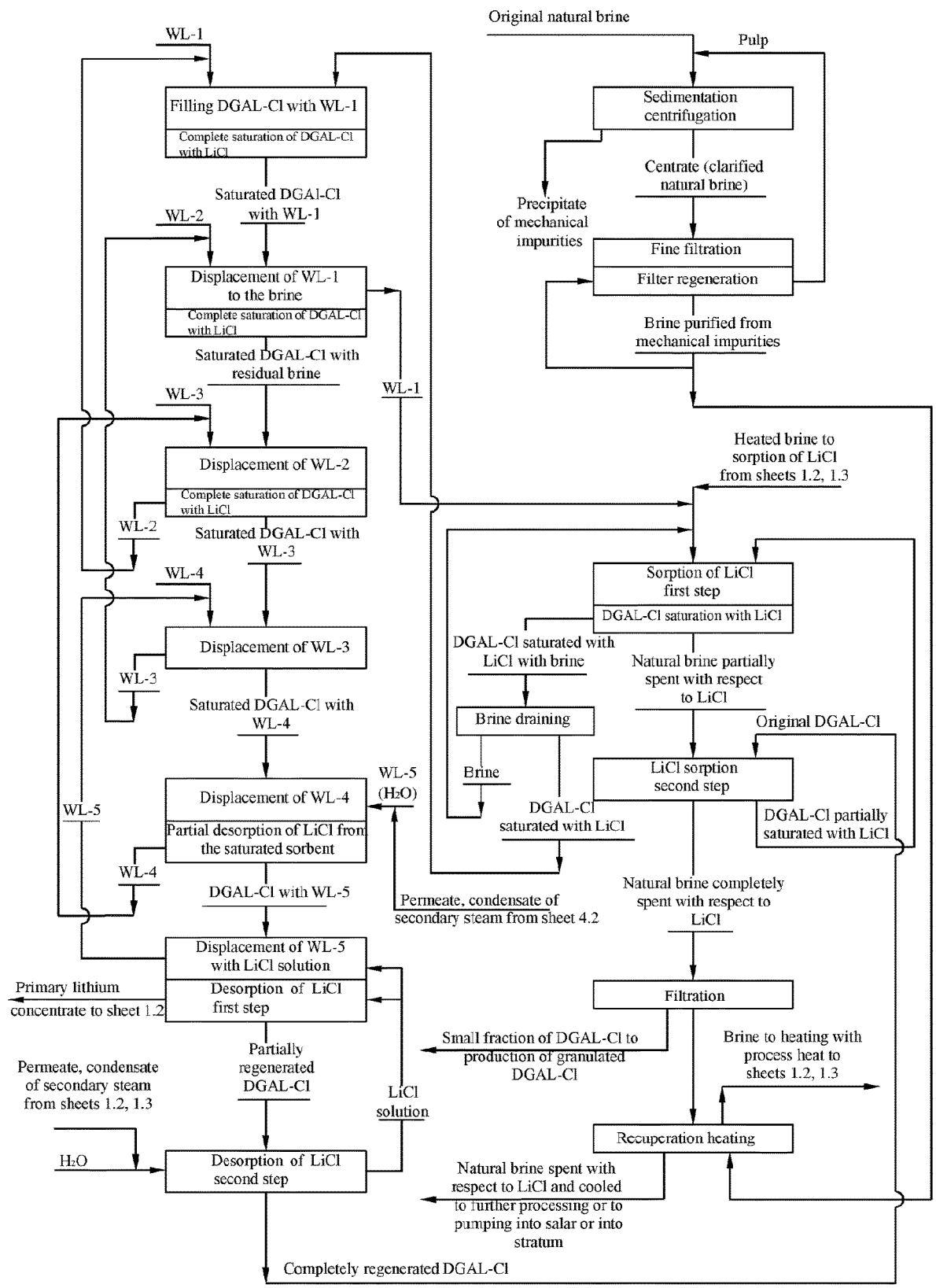
Fig. 1 (1.1)

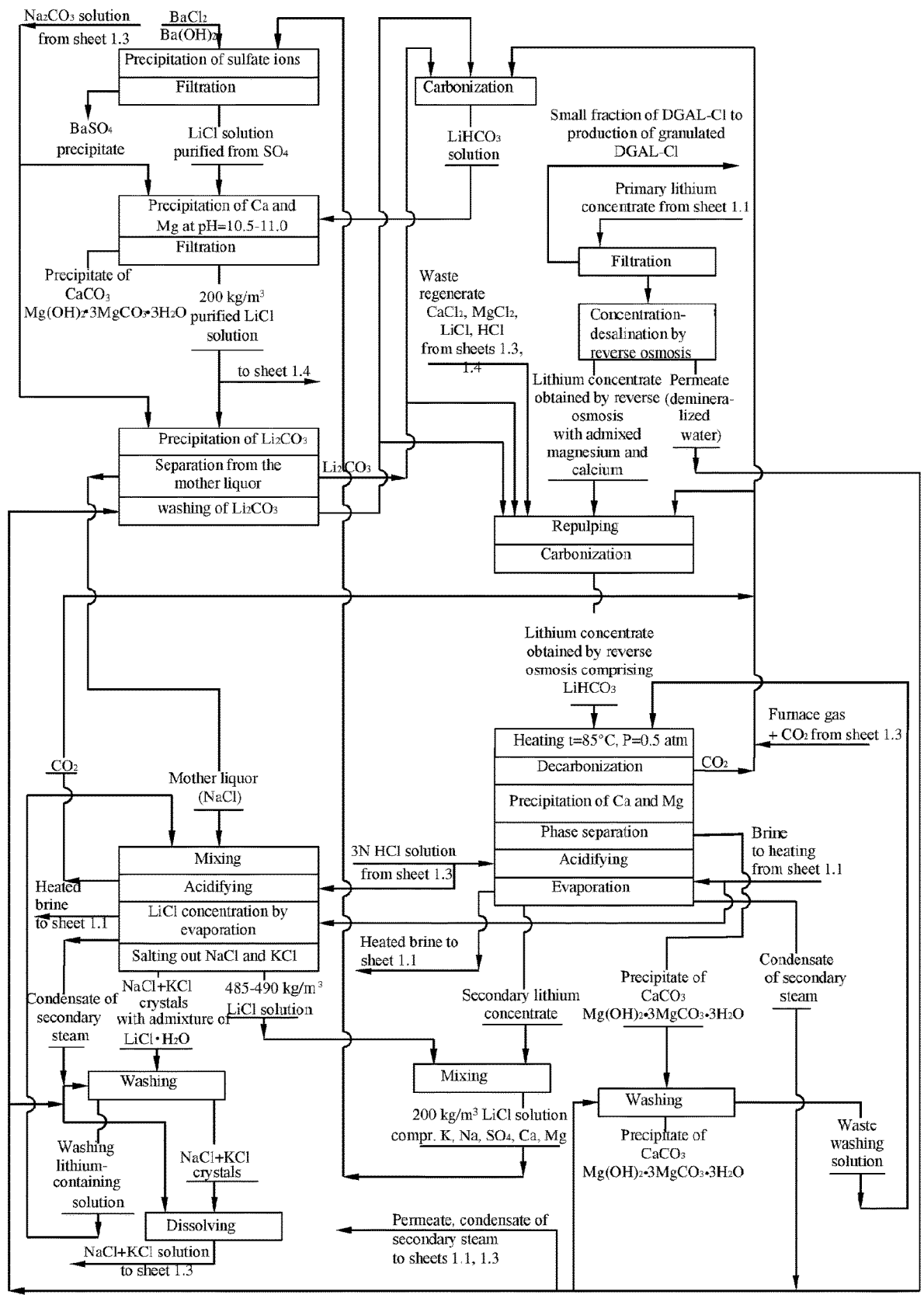
Fig. 1 (1.2)

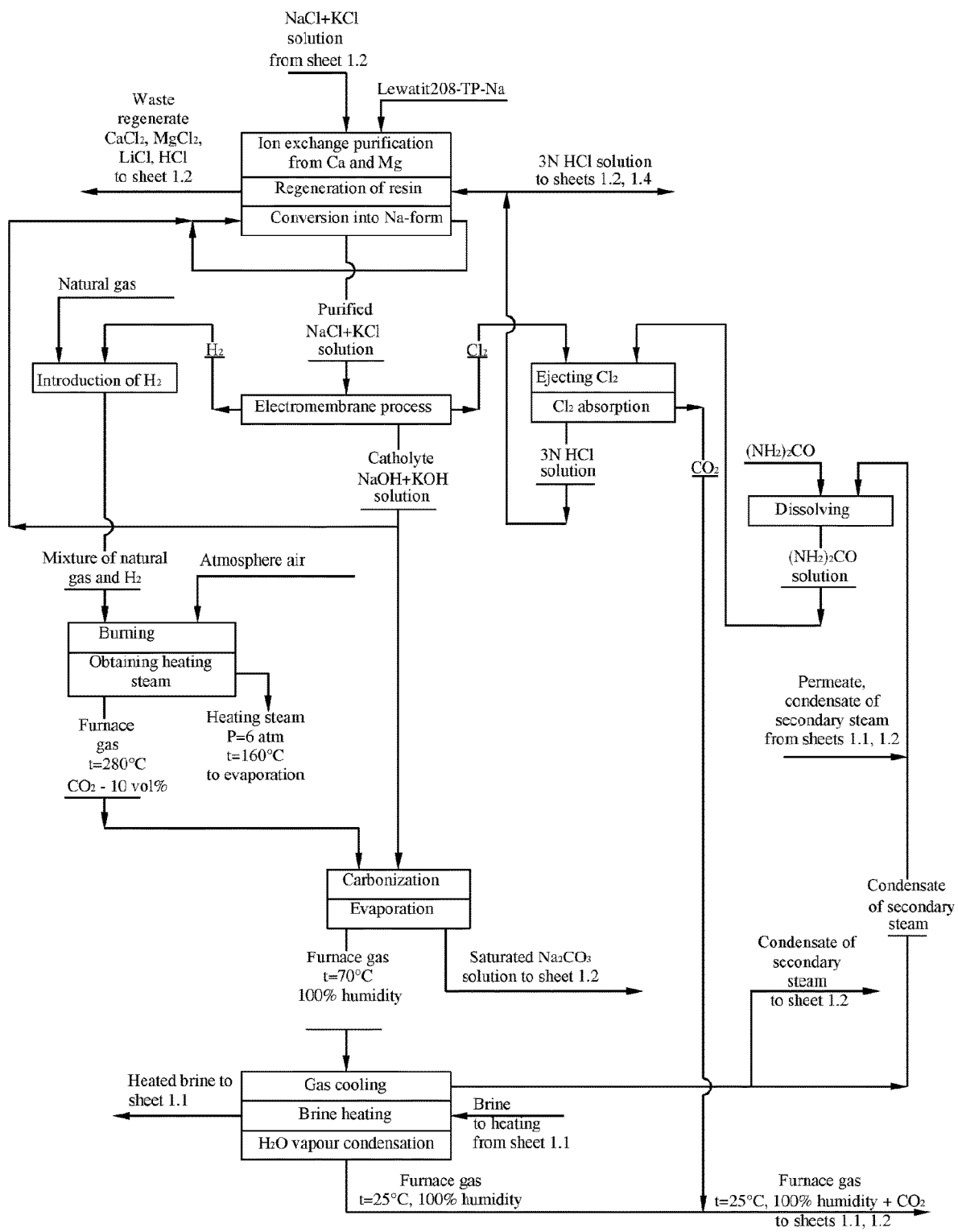
Fig. 1 (1.3)

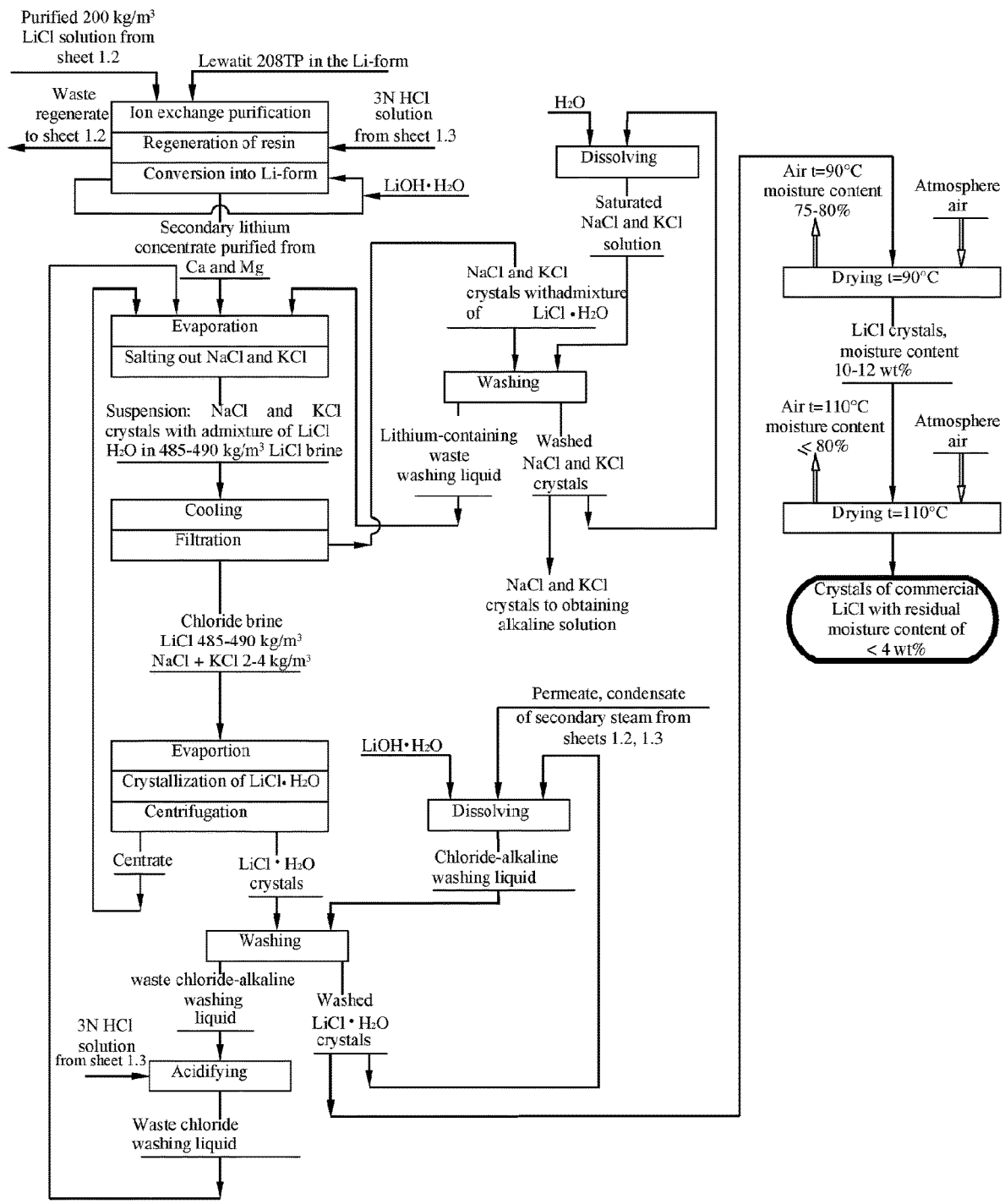
Fig. 1 (1.4)

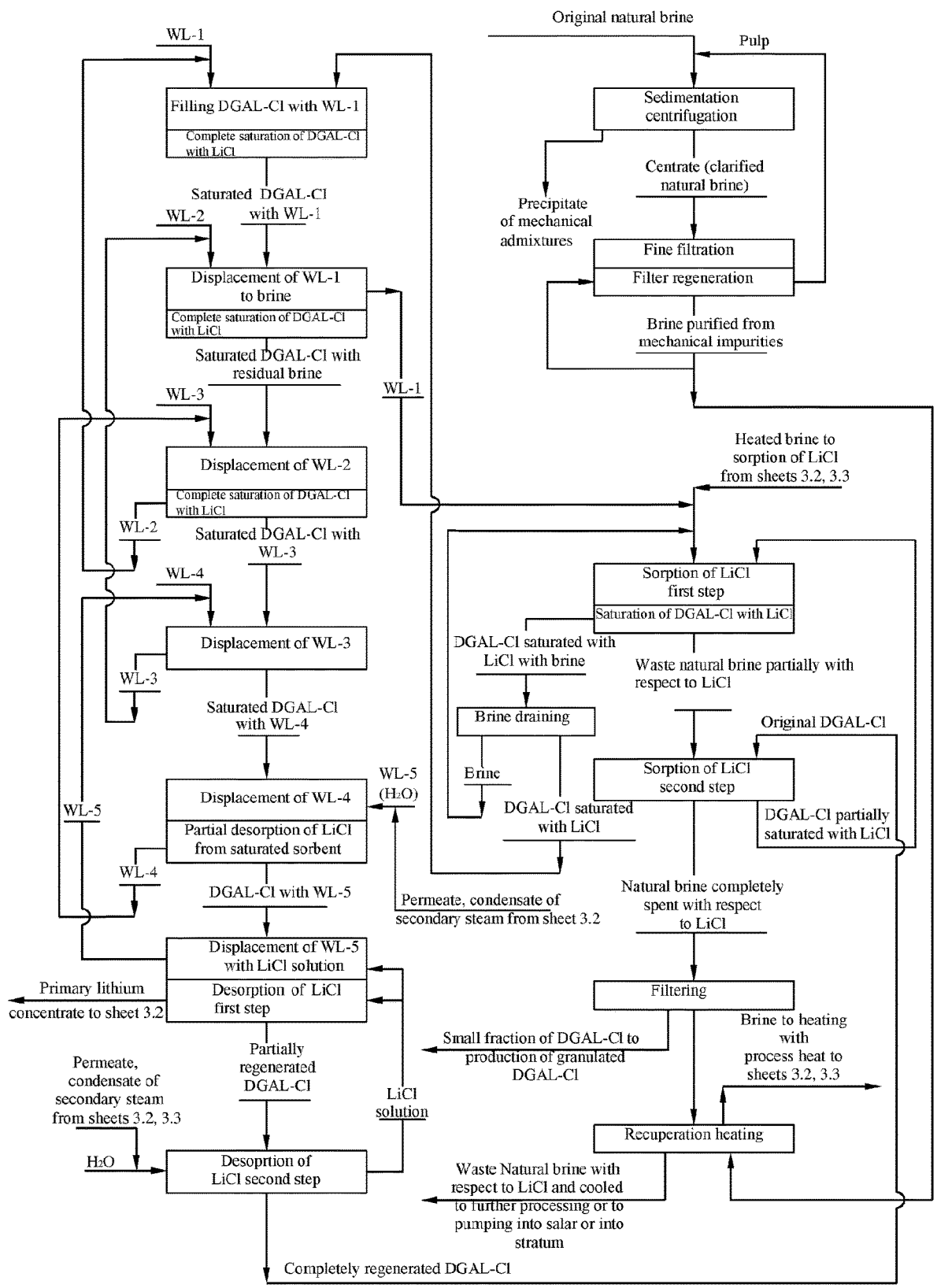
Fig. 3 (3.1)

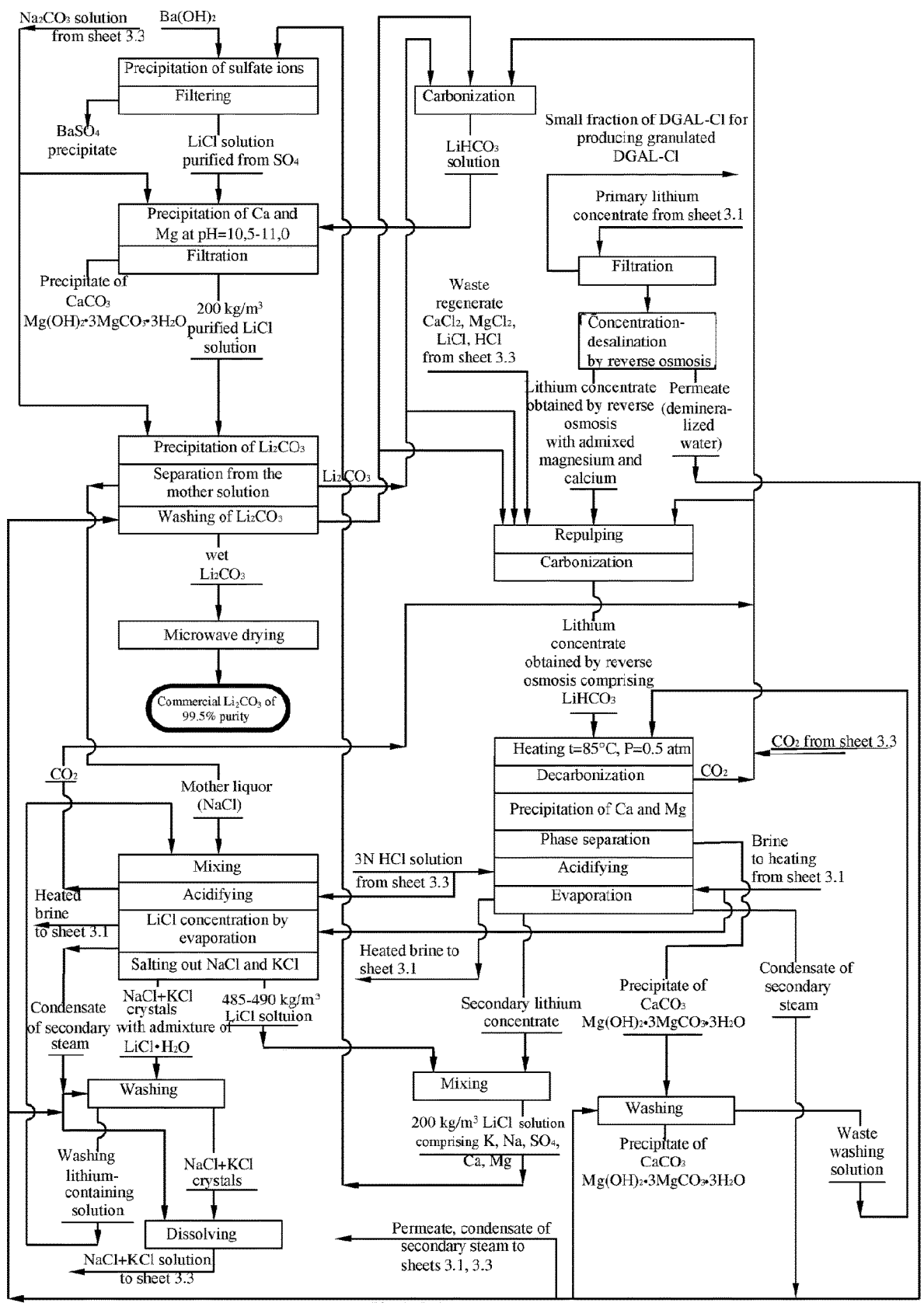
Fig. 3 (3.2)

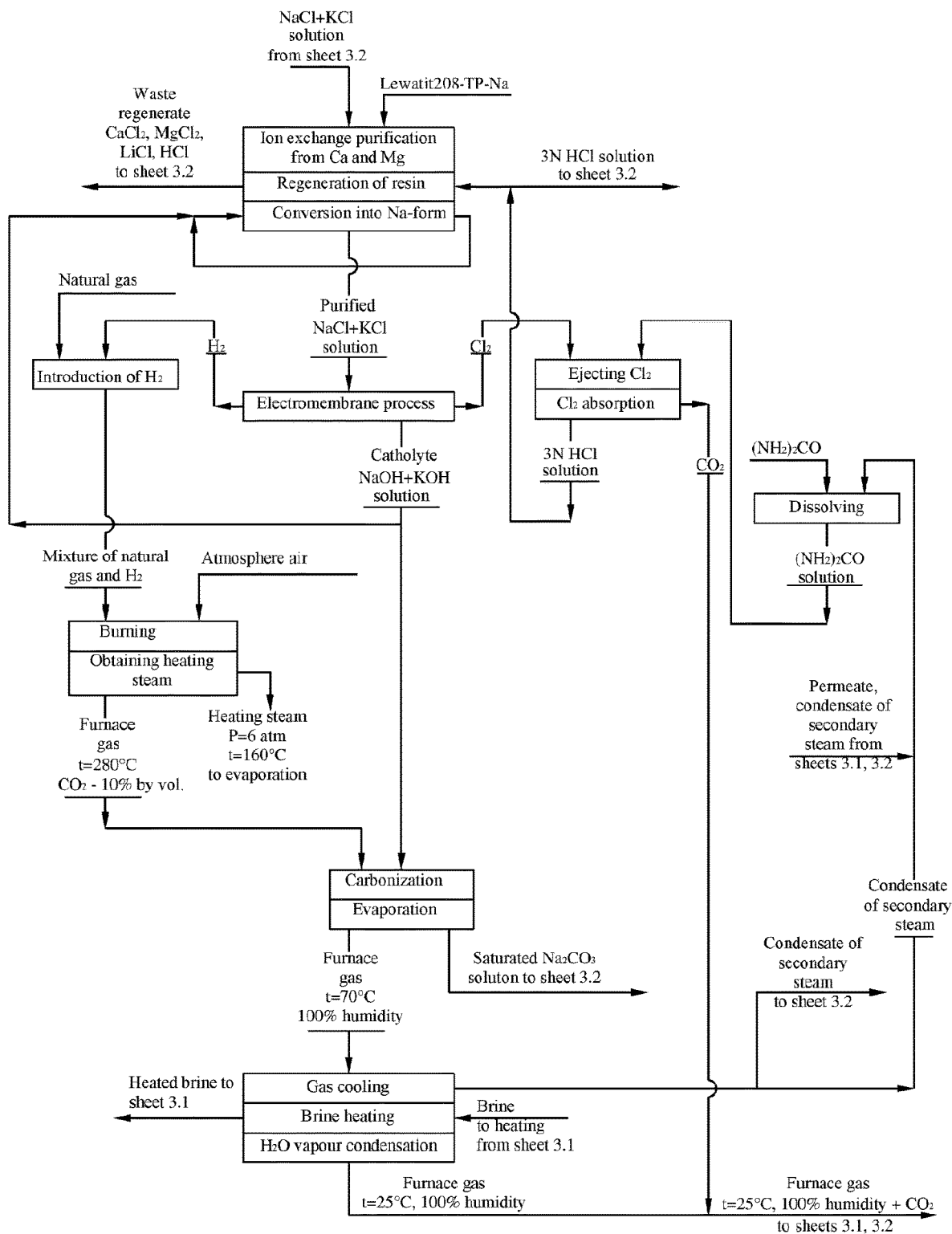
Fig. 3 (3.3)

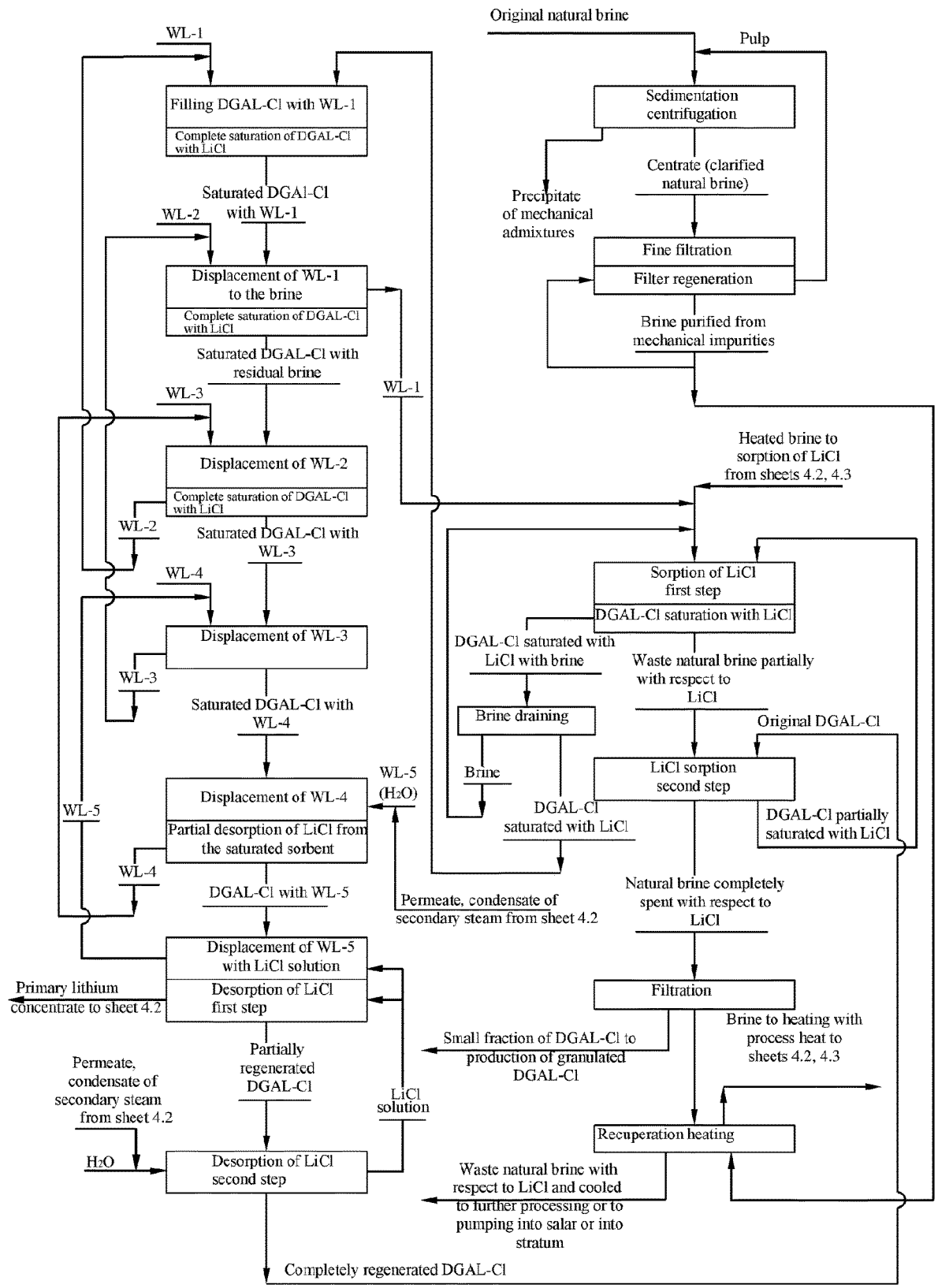
Fig. 4 (4.1)

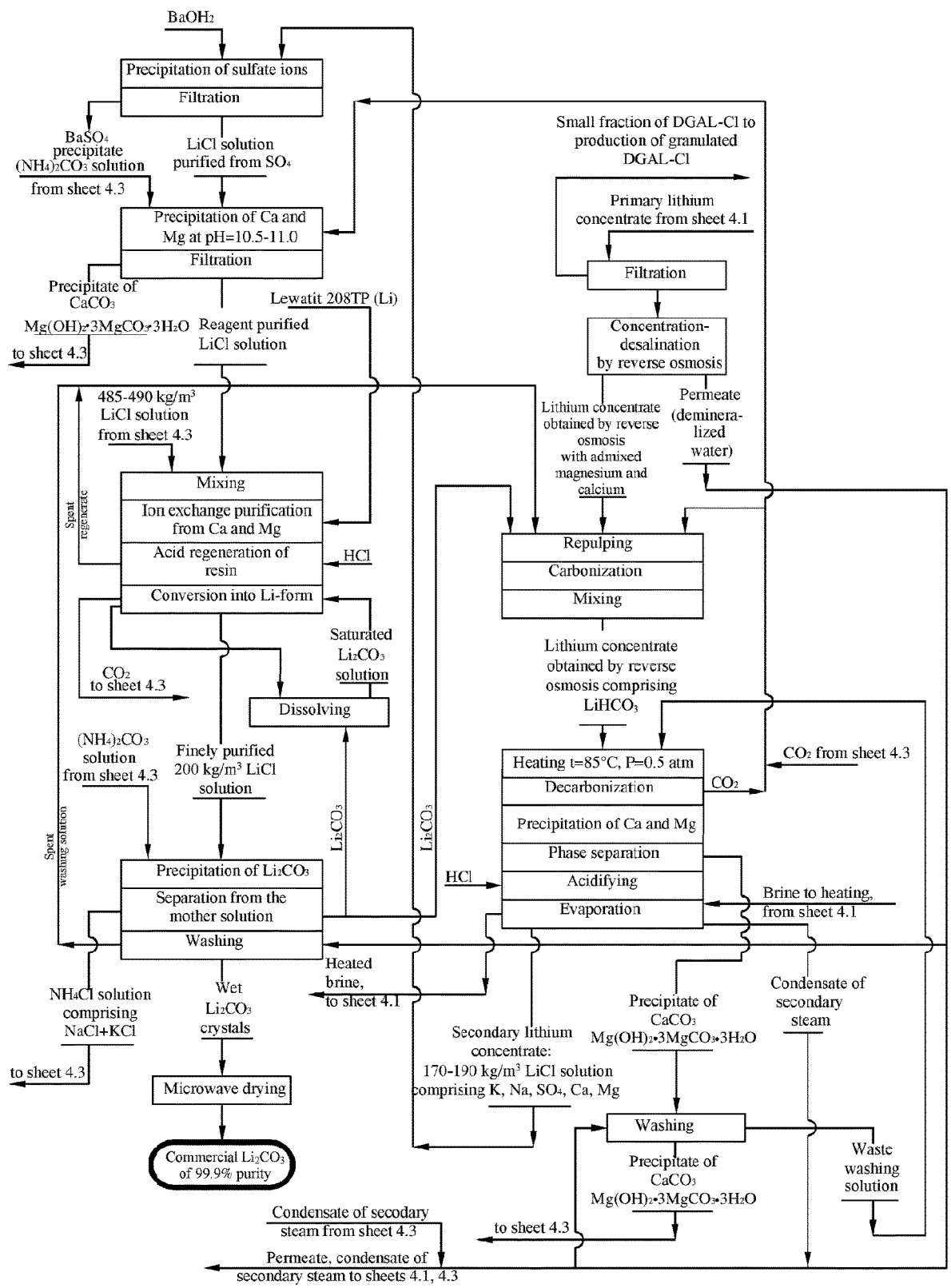
Fig. 4 (4.2)

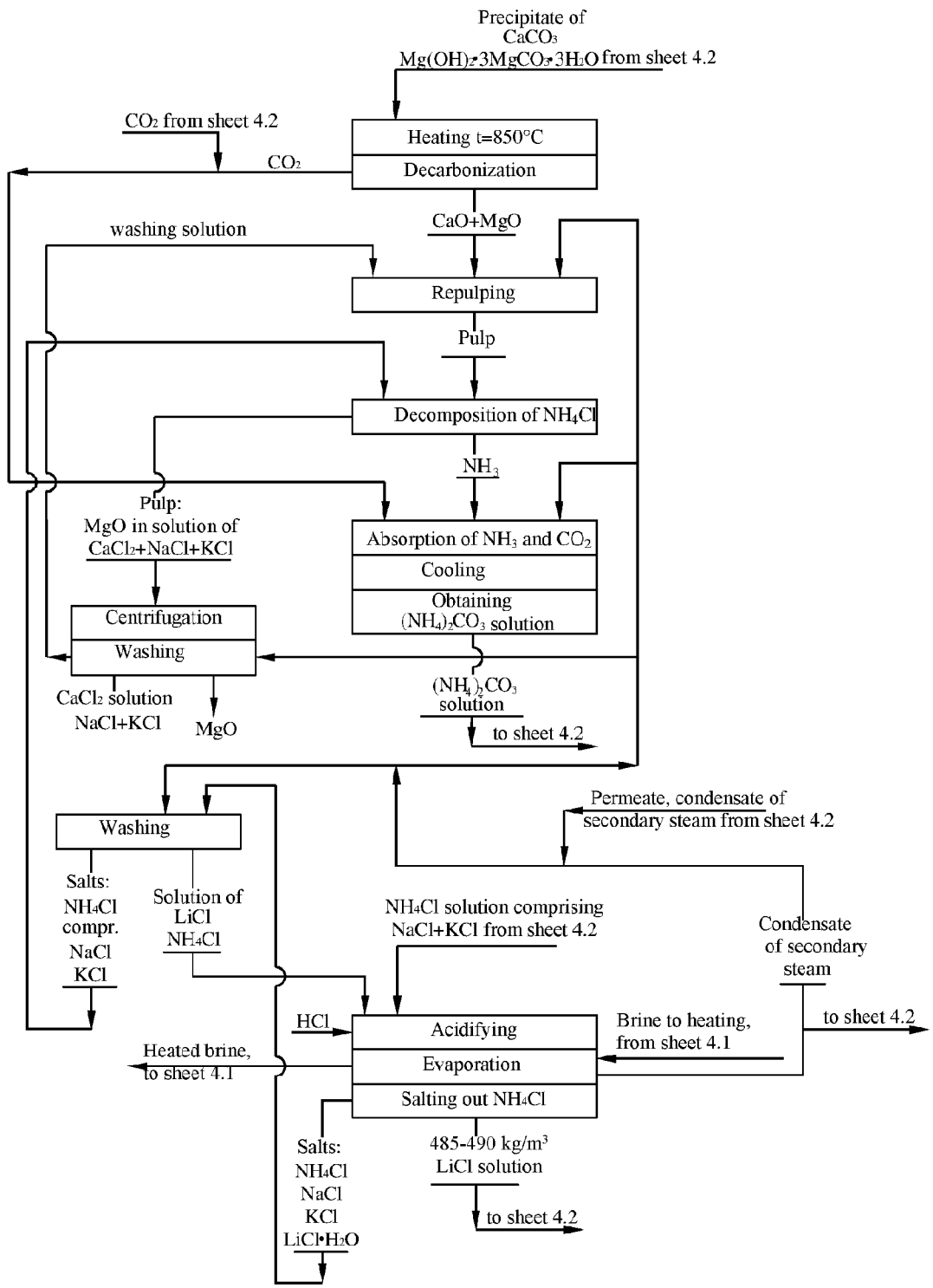
Fig. 4 (4.3)

METHOD FOR PREPARING LITHIUM CONCENTRATE FROM LITHIUM-BEARING NATURAL BRINES AND PROCESSING THEREOF INTO LITHIUM CHLORIDE OR LITHIUM CARBONATE

CROSS-REFERENCE TO RELATED APPLICATIONS

This application is a 371 of PCT Application No. PCT/RU2018/050041 filed on Apr. 13, 2018, which claim priority to Russian Application No. RU 2017113039 filed on Apr. 14, 2017, the contents of which are hereby incorporated by reference as if recited in their entirety.

TECHNICAL FIELD

The present invention relates to the field of lithium hydrometallurgy and may be used for preparing lithium concentrates by enrichment of natural lithium-bearing brines and producing commercial lithium products from these concentrates.

BACKGROUND

In the world practice lithium products are prepared both from lithium-bearing hard mineral (spodumene, lepidolite, petalite) and hydromineral (lake brines, salars brines, deep groundwater brines, mineralized waters) raw material sources.

While in the past century the manufacturers of lithium products primarily used hard mineral raw material sources, in the XXI century preference is given to lithium-bearing hydromineral raw material, since employment of this type of raw material sources allows not only to build lithium plants with higher economic and ecological performance, but also to construct manufacturing units for advanced processing of this type of raw material due to its multicomponency and affordability of recovery of other valuable components (Ostroushko Y. I., Degtyareva T. V. Hydromineral raw material is a sustainable lithium source. Analytical review. TSNIATOMINFORM, 1999, 64 p.) [1].

All modern technologies for preparing lithium salts from lithium-bearing hydromineral raw material are based on its enrichment with lithium. Enrichment with lithium of conventional lithium-bearing hydromineral raw material (natural brines of sodium chloride type with low magnesium and calcium content) is generally carried out by successive salting out macro-components upon evaporation (NaCl, KCl, $KCl.MgCl_2.6H_2O$, $MgCl_2.6H_2O$) and simultaneous concentration of the original brine with respect to lithium to contents that allow producing lithium chloride and/or carbonate from the obtained lithium concentrates of 98-99% purity (U.S. Pat. Nos. 4,243,392, 274,834) [2, 3]. Removal of admixtures ($SO_4^{2-}$, $Ca^{2+}$, $Mg^{2+}$) from thereby prepared lithium concentrates is carried out by converting the admixtures into poorly soluble $CaSO_4$, $CaCO_3$, $Mg(OH)_2$ salts using $CaCl_2$, CaO, $Na_2CO_3$ as reagents (U.S. Pat. No. 4,271,131) [4]. After reagent purification and before obtaining lithium products from lithium concentrates, boron is typically recovered in the form of boric acid by extraction with high molecular weight alcohols (U.S. Pat. No. 5,219,550) [5].

To prepare lithium products of higher grade from lithium concentrates, lithium salts LiCl and $Li_2CO_3$ are processed into salts of greater purity either by using isopropyl alcohol in which lithium chloride is highly soluble, as opposed to insoluble NaCl, KCl, $CaCl_2$, $MgCl_2$ (U.S. Pat. No. 4,271,131) [4], or by carbonizing lithium carbonate until it is completely converted into soluble and free from the main admixtures lithium bicarbonate, followed by decarbonization and precipitation of higher purity lithium carbonate (U.S. Pat. No. 6,207,126) [6].

Thus, preparation of lithium concentrate from conventional lithium-bearing hydromineral raw material does not imply deep purification thereof from admixtures due to such purification being quite challenging. Purity of lithium products prepared from such concentrate is increased by repurification of the products obtained.

It is impossible to prepare lithium concentrates with high lithium concentration from nonconventional lithium-bearing hydromineral raw material (natural brines of magnesium chloride, calcium chloride and mixed types) by conventional halurgic methods, because formation and salting out of such binary salts as $LiCl.MgCl_2.6H_2O$ and $LiCl.CaCl_2.5H_2O$, together with salted off $CaCl_2.6H_2O$ and $MgCl_2.6H_2O$ crystalline hydrates is inevitable upon its evaporation. Thus, it is only possible to prepare lithium concentrates from nonconventional lithium-bearing hydromineral raw material by selective lithium recovery followed by concentration to obtain the content of lithium that allows producing lithium carbonate or chloride. There are US patents describing the use of sorbents for selective recovery of lithium from lithium-bearing brines, the sorbents being microcrystalline lithium aluminates formed in the pores of ion exchange resin (U.S. Pat. Nos. 4,159,311, 4,221,767, 4,347,327, 4,477,367, 5,389,349) [7-11]. However, during real-time use of such sorbents it was found that, first, macropores of the resin become clogged by mechanical admixtures contained in the brines, thereby hindering the access of lithium to the crystals of the selective sorbent, and second, crystals of the selective sorbent are washed from the support very quickly.

Later a method for recovering lithium from lithium-bearing brines was proposed, which used a sorbent based on macro-crystalline form of $LiX/Al(OH)3$ compound, wherein X—$OH^-$, $Cl^-$, $NO_3^-$, $SO_4^{2-}$, capable of introducing lithium without structure disturbance (U.S. Pat. No. 5,599,516) [12].

The main deficiencies of this method, however, are large losses of sorbent due to destruction (decrepitation) of its crystals caused by inevitable local overstrain in the crystals formed and the necessity to heat the desorbing liquid to 90° C. during recovery of lithium from the saturated sorbent.

A method for preparing lithium concentrate by enriching natural lithium-bearing brines with granulated sorbent was developed, which is based on composite-amorphous form of the compound composed of $LiCl.2Al(OH)_3.mH_2O^1$, wherein m=3-5, having a defect in its structure, which upon corresponding pretreatment of the sorbent (aqueous treatment) allows creating the deficiency of lithium in the compound and carrying out a reversible process of intercalation of lithium chloride in the brine medium and deintercalation thereof in the fresh water medium (Chemistry and technology of preparing lithium compounds from lithium-bearing hydromineral raw material) [13].

[1] Hereinafter DGAL-Cl—chlorine-containing form of double aluminum lithium hydroxide A method for preparing granulated sorbent selective for lithium is described in the following sources: PCT application PCT/DE 01.04062, Germany [14], pat. RU 2223142, RU 2455063 [15, 16]. Based on this sorbent, a method for selective recovery of lithium chloride from lithium-bearing natural brines was developed, which comprises recovery of primary lithium concentrate affording further concentration with respect to lithium using any of the known methods, including evaporation. Use of the granulated sorbent based on amorphous form of LiCl.2Al(OH)$_3$.mH$_2$O compound instead of crystalline granules, from the hydrated compound LiCl/Al(OH)$_3$ allows carrying out all process stages of the enrichment process at room temperature, to give primary lithium concentrate comprising, depending on lithium concentration of the brine, from 4.0 to 6.0 g/l of lithium chloride with residual content of macrocomponent base of the brine of no more than 6.0 g/l. To minimize the weight of one-time load of the granulated sorbent, this invention used sorption-desorption enrichment unit with moving sorbent layer. The method for obtaining lithium chloride from lithium-bearing brines based on the use of granulated selective sorbent and the plant for implementation thereof are described (PCT application PCT/DE 01/04061, Germany) [17].

However, along with the apparent above-mentioned advantages this method has deficiencies, one of which is high degree of abrasion of the sorbent (more than 37% a year) during its movement in the equipment. Lithium chloride prepared in accordance with this method has a purity of no more than 98%. This method does not envisage preparation of the most sought after lithium compound, lithium carbonate. Furthermore, implementation of the alternative of the method with moving sorbent requires development of complex nonstandard equipment leading to increased expenses of practical implementation of this method.

In order to eliminate the deficiencies of this production process a method for preparing lithium concentrate from natural brines and processing thereof into lithium products is proposed (pat. RU 2516538) [18].

The above-mentioned deficiencies are eliminated in the proposed method for preparing lithium concentrate from lithium-bearing brines by carrying out the process of lithium enrichment of the brine in the sorption-desorption unit consisting of two columns filled with the granulated selective sorbent. One of the columns is in the mode of constant lithium saturation (intercalation), while the other column is in the mode of brine removal and recovery (deintercalation) of lithium from the saturated granulated sorbent. The mode of brine flow through the column at the stage of saturation can either be continuous or portion-wise (portions of the brine of predetermined volume with various content of LiCl, increasing with each portion). During the portion-wise mode the first portion of the brine that was subjected to the stage of contact with the granulated sorbent is considered waste with respect to the content of lithium. Removal of the brine from the saturated granulated sorbent is carried out by stepwise displacement with portions of sodium chloride solution or portions of lithium concentrate. Desorption of lithium chloride from the brine-free granulated sorbent is also carried out stepwise using portions of water with various content of LiCl, until complete removal of intercalated lithium chloride from the granulated sorbent. The primary lithium concentrate obtained, which is an aqueous LiCl solution with concentration of 5.0 to 5.5 kg/m$^3$ comprising CaCl$_2$, MgCl$_2$, NaCl, KCl, sulfate ions as admixtures, is purified from calcium and magnesium using ion exchange method on the KU-2 cation-exchange resin in the Li-form or by conversion into insoluble compounds CaCO$_3$ and Mg(OH)$_2$.3MgCO$_3$.3H$_2$O by bringing the primary lithium concentrate into contact with the solid phase of lithium carbonate at a temperature of 60-90° C. The primary lithium concentrate is then subjected to concentration in the evaporating basins to LiCl content of 220-350 kg/m$^3$ or by reverse osmosis method with subsequent evaporation to LiCl content of 350-400 kg/m$^3$, whereby NaCl and KCl are salted out, is diluted with demineralized water to the content of 190-210 kg/m$^3$, subjected to reagent purification from calcium and magnesium and is used as producing lithium concentrate for obtaining lithium compounds: lithium carbonate, lithium hydroxide monohydrate, lithium chloride, etc. Proposed method allows lowering the degree of abrasion of the sorbent to 7-10% and bringing the purity of lithium carbonate obtained by said method up to 99.5%.

By its technical essence and the achieved result this method for preparing lithium concentrate from lithium-bearing natural brines and processing thereof is the closest analogue of the claimed method, and it is chosen by the authors as the prototype. Along with the above-mentioned advantages the prototype has the following deficiencies.

One of the deficiencies is unability to achieve high lithium recovery ratio from the brines under conditions of achieving high degree of saturation of the granulated sorbent. In order to bring the dynamic capacity with respect to lithium chloride close to the predicted value under the conditions which provide the maximum driving force to the process of lithium intercalation, i. e. during filtration of the original brine through the sorbent layer "continuously", lithium chloride recovery ratio from the brine is 50-55%. During the stepwise mode of contacting the brine with the sorbent lithium chloride recovery ratio may be increased up to 75-80%, but simultaneously the total volume of the brine filtered through the sorbent during the same time period increases by several times. This especially adversely impacts processing of brine with low LiCl content (less than 1 kg/m$^3$), when total flow rate of the brine filtered through the sorbent goes beyond the actual flow capacity of the equipment.

The second significant deficiency of this method is arranging the brine displacement process from the sorbent layer by the displacement liquid in the direction downwards from the top and using sodium chloride solution or primary lithium concentrate as the displacement liquid. The movement of displacement liquid downwards from the top leads to significant compaction of the sorbent layer and to an increase in the hydraulic resistance. Due to high content of CaCl$_2$ and MgCl$_2$ of the brine during the contact of the brine with sodium chloride solution, upon displacement sodium chloride is salted out from the solution and its solid phase is deposited within the sorbent layer. Use of primary lithium concentrate as the salting-out liquid leads to lower yield of commercial primary lithium concentrate.

Furthermore, purification of primary lithium concentrate in the prototype method is associated either with high investment costs in case of using the alternative with ion exchange purification on the KU-2 cation-exchange resin in the Li-form, or with low efficiency of the purification process in case of the alternative of calcium and magnesium removal in the form of poorly soluble compounds upon contacting the heated primary lithium concentrate with the solid lithium carbonate phase, which is a significant deficiency of this method. The following should also be listed among the deficiencies of the prototype method: the absence of technological solutions with respect to purification of the natural lithium-bearing brine from mechanical admixtures, the absence of measures for recycling solid waste product represented by sodium chloride prepared upon evaporation of the mother liquor from the stage of lithium carbonate precipitation with soda ash; unability to obtain battery-grade lithium carbonate (purity qualification of 99.9%) due to higher concentration of admixtures, which are alkali metals, calcium and magnesium. Besides, the method does not envisage preparation of anhydrous lithium chloride from the secondary lithium concentrate, which along with lithium carbonate is a sought after commercial lithium product.

Proposed method for preparing lithium concentrate from lithium-bearing natural brines and processing thereof into lithium chloride and/or lithium carbonate preserves all the advantages of the prototype and eliminates its main deficiencies.

SUMMARY OF THE INVENTION

Technical result of the proposed method which allows eliminating said deficiencies is achieved by preliminary treatment of the natural brine to remove suspended solids by sedimentation centrifugation of the brine with removal of the formed precipitate, followed by filtering the centrate with fine filters regenerated by back washing with the stream of filtered brine followed by feeding the stream of the waste regenerating brine to the stage of sedimentation centrifugation together with the original lithium-bearing natural brine, if the content of suspended solids in the original lithium-bearing natural brine is 1.0 kg/m$^3$ and higher, or by filtering the original natural lithium-bearing brine with fine filters regenerated by back washing with the stream of filtered brine followed by sedimentation centrifugation of the stream of waste regenerating solution with removal of the precipitate and feeding the centrate to the stage of filtering together with the original natural lithium-bearing brine, if the content of suspended solids in the original natural brine is less than 1.0 kg/m$^3$.

Technical result is achieved by preparation of the primary lithium concentrate by its sorption enrichment with lithium using granulated sorbent based on the compound $LiCl.2Al(OH)_3.H_2O$, wherein m=3-5; primary lithium concentrate is prepared in sorption-desorption units, each consisting of four columns filled with the granulated sorbent, two of which are in the process of lithium chloride sorption from the brine, one is in the process of washing the sorbent saturated with lithium chloride from the brine, and one is in the process of lithium chloride desorption from the sorbent washed from the brine, the stream of the brine separated from suspended solids is always first passed through the column with the sorbent partially saturated with lithium chloride (first sorption step), then through the column with the sorbent that was subjected to the stage of lithium chloride desorption from the sorbent (second sorption step), wherein after the sorbent is completely saturated with lithium chloride in the first column in the direction of the movement of the brine stream, this column is changed over to the stage of washing the sorbent from the brine, the column that was in the process of washing the sorbent from the brine is changed over to the stage of lithium chloride desorption from the saturated sorbent, the column that was in the process of lithium chloride desorption from the saturated sorbent is changed over to the stage of sorption as the second step column, using the column with partially saturated sorbent as the first sorption step, which on the previous sorption stage was used as the second step column, then the cycle is repeated following the experimentally established cyclogram; the linear velocity of liquid phases in the columns on all stages of producing primary lithium concentrate is maintained at the level of 5-7 m/h, wherein the sorbent is washed from brine by preliminary draining the brine from the column, then stepwise washing of the sorbent successively with five portions of washing liquid in the upward direction, each having ⅓ of the volume of the sorbent in the column, wherein four portions out of five are the washing liquids with various content of brine components which decreases with each step of washing, and the fifth portion is the volume of fresh water, wherein the first portion of the washing liquid is used to fill the column and then is displaced from the column with the second portion of the washing liquid, directing the displaced volume to mixing with the natural lithium-bearing brine purified from suspended solids, the second portion of the washing liquid is displaced from the column with the third portion of the washing liquid and is used in the next washing cycle as the first portion of the washing liquid, the third portion of the washing liquid is displaced from the column with the fourth portion of the washing liquid and is used in the next cycle as the second portion of the washing liquid, the fourth portion of the washing liquid is displaced with the fifth portion of the washing liquid (fresh water) and is used in the next cycle as the third portion of the washing liquid, the fifth portion of the washing liquid is displaced from the column with the corresponding portion of the desorbing liquid and is used in the next cycle as the fourth portion of the washing liquid, in the next cycle fresh portion of fresh water is used as the fifth portion of the washing liquid, desorption of lithium chloride from the sorbent washed from the brine is carried out by successive stepwise filtering of predetermined volumes of the desorbing liquids, on the assumption that after bringing the first volume of the desorbing liquid, which is a diluted aqueous lithium chloride solution with admixed residual brine components (first step desorbing liquid), into contact with the sorbent, it is removed from the process as the primary lithium concentrate, after bringing the second volume of the desorbing liquid, which is fresh water (second step desorbing liquid), into contact with the sorbent, it is used as the first step desorbing liquid of the desorption stage in the next cycle together with the volume of the desorbing liquid displaced from the column by the corresponding volume of lithium-bearing brine at the sorption stage of the next cycle;

Technical result is achieved by converting the primary lithium concentrate obtained from lithium-bearing natural brine into secondary lithium concentrate using one of the following alternatives:

according to the first alternative, primary lithium concentrate is subjected to solar concentration with respect to lithium chloride in the evaporating basin with simultaneous purification from calcium and magnesium by preliminary separating the primary lithium concentrate into two streams, in one of which the predetermined amount of lithium carbonate by weight is repulped, the pulp is carbonized with carbon dioxide or $CO_2$ comprising gaseous mixture in the mode of pulp circulation until all lithium carbonate is dissolved, then this stream is mixed with the other stream of primary lithium concentrate, mixed solution is directed into the evaporating basin for concentration of the liquid phase with respect to LiCl to 220 kg/m$^3$, decarbonization and gradual conversion of soluble calcium and magnesium chlorides into poorly soluble compounds $CaCO_3$ and $Mg(OH)_2.3Mg(OH)_2.3H_2O$, which are separated from the concentrated lithium chloride solution comprising NaCl and KCl as main admixtures, to obtain LiCl content of 190-200 kg/m$^3$, which is the used to obtain lithium chloride or lithium carbonate;

according to the second alternative, the predetermined amount of $Li_2CO_3$ by weight is repulped in the primary lithium concentrate obtained by concentration-desalination by reverse osmosis, the pulp is carbonized with carbon dioxide or $CO_2$ comprising gaseous mixture in the mode of pulp circulation until all lithium carbonate is dissolved, the solution is heated to a temperature of 80-85° C. under vacuum treatment up to 0.5 atm, decarbonized, directing the released carbon dioxide to the stage of carbonization of the pulp prepared from lithium carbonate and lithium concentrate obtained by reverse osmosis, and simultaneously converting $CaCl_2$ and $MgCl_2$ into insoluble $CaCO_3$ and $Mg(OH)_2.3MgCO_3.3H_2O$ precipitates, which are separated from the liquid phase, the liquid phase of an aqueous LiCl solution with admixed NaCl and KCl, is concentrated with respect to lithium chloride using electrodialysis or heating process, or a combination thereof, whereupon the LiCl solution is brought to a concentration of 190-200 kg/m³ (of the secondary lithium concentrate), which is then used to obtain lithium chloride or lithium carbonate;

Technical result is achieved by first subjecting the lithium chloride obtained from the secondary lithium concentrate to reagent purification from magnesium, calcium, sulfate and borate ions using barium hydroxide or oxide and carbon dioxide as reagents, then to fine ion exchange purification on the Lewatit 208-TP polyampholyte in the Li-form or analogues thereof, concentration by evaporation to LiCl content of 485-490 kg/m³ (lithium chloride brine), whereby the crystals of NaCl and KCl are salted out, the obtained lithium chloride brine is cooled to room temperature, precipitated NaCl and KCl crystals with admixed $LiCl.H_2O$ crystals are separated from the liquid phase, the crystals are washed stepwisely in the mode of repulping and squeezing with three portions of washing chloride brine, each having two times the volume of the portion of the crystals being washed, two of which portions are mixed chloride solutions (NaCl+KCl+LiCl) with content of LiCl decreasing with each portion, and the third portion is a mixed solution of alkali metal chlorides which is free of LiCl, the first portion of the washing chloride solution (waste washing liquid) is directed to the stage of evaporation, preliminarily mixing it with the secondary lithium concentrate purified from the admixtures, the other two portions of washing chloride solution are used for successive stepwise washing of the next portion of crystals, fresh (the third) portion of chloride washing solution is prepared by dissolving sodium chloride or sodium chloride with admixed potassium chloride in demineralized water, wherein the cooled and separated from the crystals of precipitated salts lithium chloride brine with residual NaCl+KCl content of no more than 2 kg/m³ is evaporated until LiCl is converted into solid lithium chloride monohydrate phase, the residual mother liquor from the stage of lithium chloride brine evaporation and crystallization of $LiCl\ H_2O$ is separated from the lithium chloride monohydrate crystals and mixed with the purified secondary lithium concentrate being transported for evaporation, lithium chloride monohydrate crystals are washed from the residual mother liquor with a washing liquid composed of, in wt %: LiCl—(98.5-99.0), LiOH—(1.0-1.5), waste liquid is acidified with hydrochloric acid to a pH=6-7 and mixed with the purified secondary lithium concentrate being transported for evaporation, washed $LiCl\ H_2O$ crystals are processed from the residual alkalinity by bringing them into contact with the calculated amount of hydrochloric acid and dried until anhydrous lithium chloride is obtained by two-step air flow-drying, maintaining the temperature of the drying zone at 85-90° C. during the first step, 108-110° C. during the second step, the moisture content of the air flow at the outlet of the drying zones being 75-80%, the other stream of secondary lithium concentrate is used for precipitating lithium carbonate therefrom upon bringing it into contact with the solution of sodium carbonate or the solution of sodium carbonate comprising potassium carbonate, precipitated lithium carbonate is separated from the mother liquor from the $Li_2CO_3$ precipitating stage by centrifugation and is directed to repulping with the part of the stream of primary lithium concentrate or with the stream of lithium concentrate obtained by reverse osmosis, the mother liquor from the lithium carbonate precipitating stage is acidified with hydrochloric acid to a pH=6.0-6.5, evaporated to obtain LiCl concentration in the liquid phase of 485-490 kg/m³, liquid phase is separated from the salted out NaCl crystals with admixed KCl crystals and is mixed with the stream of secondary lithium concentrate used for obtaining lithium chloride, NaCl crystals with admixed KCl crystals are washed from the residual mother liquor, mixed with the washed NaCl and KCl crystals that were salted out during evaporation of the stream of the secondary lithium concentrate during production of LiCl, dissolved in the calculated volume of demineralized water to obtain a solution of alkali metal chlorides with NaCl concentration of 250-260 kg/m³, obtained solution is subjected to electromembrane process, generating NaOH solution and hydrogen at the cathode and chlorine at the anode, generated hydrogen is mixed with the stream of natural gas, the gaseous mixture is burned to give heat energy for obtaining heating steam, which in turn is used as heating medium in evaporating lithium concentrates and mother chloride solution from the $Li_2CO_3$ precipitating stage, the furnace gas comprising $CO_2$ is used for carbonizing the $Na_2CO_3$ solution, converting it into $Na_2CO_3$ solution (carbonate solution) and using it as the precipitating reagent at the lithium carbonate precipitating stage, anodic chlorine is introduced with the stream of aqueous carbamide solution, thereby producing hydrochloric acid solution used for acidifying carbonate-containing solutions before evaporation thereof and for regeneration of the waste Lewatit 280-TP polyampholyte;

Technical result is achieved by obtaining technical-grade lithium carbonate from the secondary lithium concentrate subjected to reagent purification from calcium, magnesium, sulfate and borate ions by precipitating lithium carbonate from the whole stream of the secondary lithium concentrate by bringing it into contact under stirring at a temperature of 90-95° C., with the sodium carbonate solution comprising potassium carbonate, whereby after separation from the mother liquor one part of lithium carbonate is precipitated and used for obtaining lithium bicarbonate solution which is then used to purify the primary lithium concentrate or the lithium concentrate obtained by reverse osmosis from calcium and magnesium, the other (producing) part of lithium carbonate is washed stepwisely in the mode of repulping and centrifugation with three portions of washing solution having three times the volume of the portion of lithium carbonate being washed at a temperature of 90-95° C., first with two portions of saturated lithium carbonate solution with the content of sodium and chloride ion decreasing with each portion, and then with a portion of demineralized water, wherein after bringing the first portion of the washing solution into contact with lithium carbonate it is directed to the stage of $Li_2CO_3$ pulp production used for carbonization, converting the solid $Li_2CO_3$ phase into $LiHCO_3$ solution and using it for purification of the primary lithium concentrate or the lithium concentrate obtained by reverse osmosis from calcium and magnesium, the other two portions of the washing solution are used for successive stepwise washing of the next portion of lithium carbonate, washed lithium carbonate crystals are subjected to microwave drying to a residual moisture content of 0.4% by weight;

Technical result is achieved by obtaining battery-grade lithium carbonate from the secondary lithium concentrate subjected to reagent purification from calcium, magnesium, sulfate and borate ions and fine ion exchange purification from calcium and magnesium on the Lewatit 208-TP polyampholyte in the Li-form by carrying out precipitation with saturated aqueous ammonium carbonate solution at room temperature, the lithium carbonate precipitate is separated from the mother ammonium chloride solution, one part of the lithium carbonate precipitate is used for obtaining lithium bicarbonate solution which is then used to purify of the primary lithium concentrate or lithium concentrate obtained by reverse osmosis from calcium and magnesium, the other (producing) part of the lithium carbonate precipitate is washed stepwisely in the mode of repulping and centrifugation with three portions of the washing solution, each having three times the volume of the portion being washed, at a temperature of 90-95° C., first with two portions of saturated lithium carbonate solution with the content of ammonium and chloride ions decreasing with each portion, and then with a portion of demineralized water, wherein after bringing the first portion of the washing solution into contact with lithium carbonate it is directed to the stage of $Li_2CO_3$ pulp production used for carbonization, converting the solid $Li_2CO_3$ phase into $LiHCO_3$ solution and using it for purification of the primary lithium concentrate or the lithium concentrate obtained by reverse osmosis from calcium and magnesium, the other two portions of the washing solution are used for successive washing of the next portion of lithium carbonate, washed lithium carbonate crystals are subjected to microwave drying to a residual moisture content of 0.2% by weight, ammonium chloride is salted out from the mother liquor from the lithium carbonate precipitating stage by evaporation, after separation from the mother liquor from the evaporation stage ammonium chloride is washed from the residual mother liquor, waste washing solution is directed to evaporation by mixing it with the mother liquor from the lithium precipitating stage, the mother liquor from the stage of evaporation and salting out ammonium chloride crystals, which is 480-490 kg/m³ LiCl solution with admixed $NH_4Cl$, is in turn mixed with the secondary lithium concentrate before its ion exchange purification on the Lewatit 208-TP polyampholyte in the Li-form, ammonium chloride washed from the mother liquor is decomposed by treating it with water pulp comprising CaO or CaO as the solid phase with admixed MgO, $SiO_2$ and $Fe_2O_3$, removing the released ammonia, mixing it with carbon dioxide at the ratio of 2:1 and absorbing the gaseous mixture by water upon cooling the liquid and gaseous phases in the stepwise countercurrent mode, removing the waste absorbent as saturated ammonium carbonate solution used for precipitating lithium carbonate, the pulp formed after the removal of ammonia is separated by filtration or centrifugation, the liquid phase of calcium chloride solution with admixed NaCl and KCl is removed from the process and used in municipal services as a reagent for consolidation of earth roads (summer season) and as a deicing reagent (winter season), solid phase of MgO with admixed $SiO_2$ and $Fe_2O_3$ is used for the production of magnesium products, calcium oxide and carbon dioxide necessary for decomposition of ammonium chloride and production of $(NH_4)_2CO_3$ solution are obtained by thermal decomposition of the precipitate of $CaCO_3$ and $Mg(OH)_2.3MgCO_3.3H_2O$ salts formed at the stage of purifying the primary lithium concentrate from calcium and magnesium, mixed with comminuted natural limestone or dolomite.

Advantages of the proposed solutions in comparison to prototype method consist in:

1. Expanding the range of lithium-bearing hydromineral raw material sources suitable for producing lithium compounds by using lithium-bearing natural brines comprising suspended solids;

2. Increasing the degree of lithium chloride selective recovery in sorption enrichment of lithium-bearing natural brines with lithium chloride using the DGAL-C1 granulated sorbent, to obtain primary lithium concentrate;

3. Lowering the losses of lithium chloride and reducing energy consumption in production of lithium concentrate by developing an advantageous procedure for brine removal from the columns of the sorption-desorption units prior to the desorption stage;

4. More cost efficient method for purification of the primary lithium concentrate or the lithium concentrate obtained by reverse osmosis from calcium and magnesium;

5. Obtaining anhydrous lithium chloride of a grade corresponding to a technical specification TU 95.1926-89 and suitable for obtaining battery-grade lithium metal;

6. Avoiding using imported soda ash in production of technical-grade $Li_2CO_3$ by substituting is with the soda ash solution prepared from the mother liquor from the $Li_2CO_3$ precipitation stage and effluent furnace gas;

7. Possibility of producing battery-grade lithium carbonate from the primary lithium concentrate, substituting the expensive imported soda ash reagent with the cheaper local limestone or dolomite.

The data supporting possibility of realization of the claimed invention are presented on FIGS. 1-4 and in the Examples.

DESCRIPTION OF THE DRAWINGS

FIG. 1. (sheets 1.1, 1.2, 1.3, 1.4) Flow chart of obtaining primary lithium concentrate from lithium-bearing natural brines and processing thereof into anhydrous lithium chloride FIG. 2. Operational scheme for sorption-desorption unit of four columns with granulated selective DGAL-C1 sorbent FIG. 3. (sheets 3.1, 3.2, 3.3). Flow chart of obtaining primary lithium concentrate from lithium-bearing natural brines and processing thereof into technical-grade lithium carbonate using the scheme with soda ash.

FIG. 4. (sheets 4.1, 4.2, 4.3) Flow chart of obtaining primary lithium concentrate from lithium-bearing natural brines and processing thereof into battery-grade lithium carbonate using the scheme with limestone.

Figure 2:
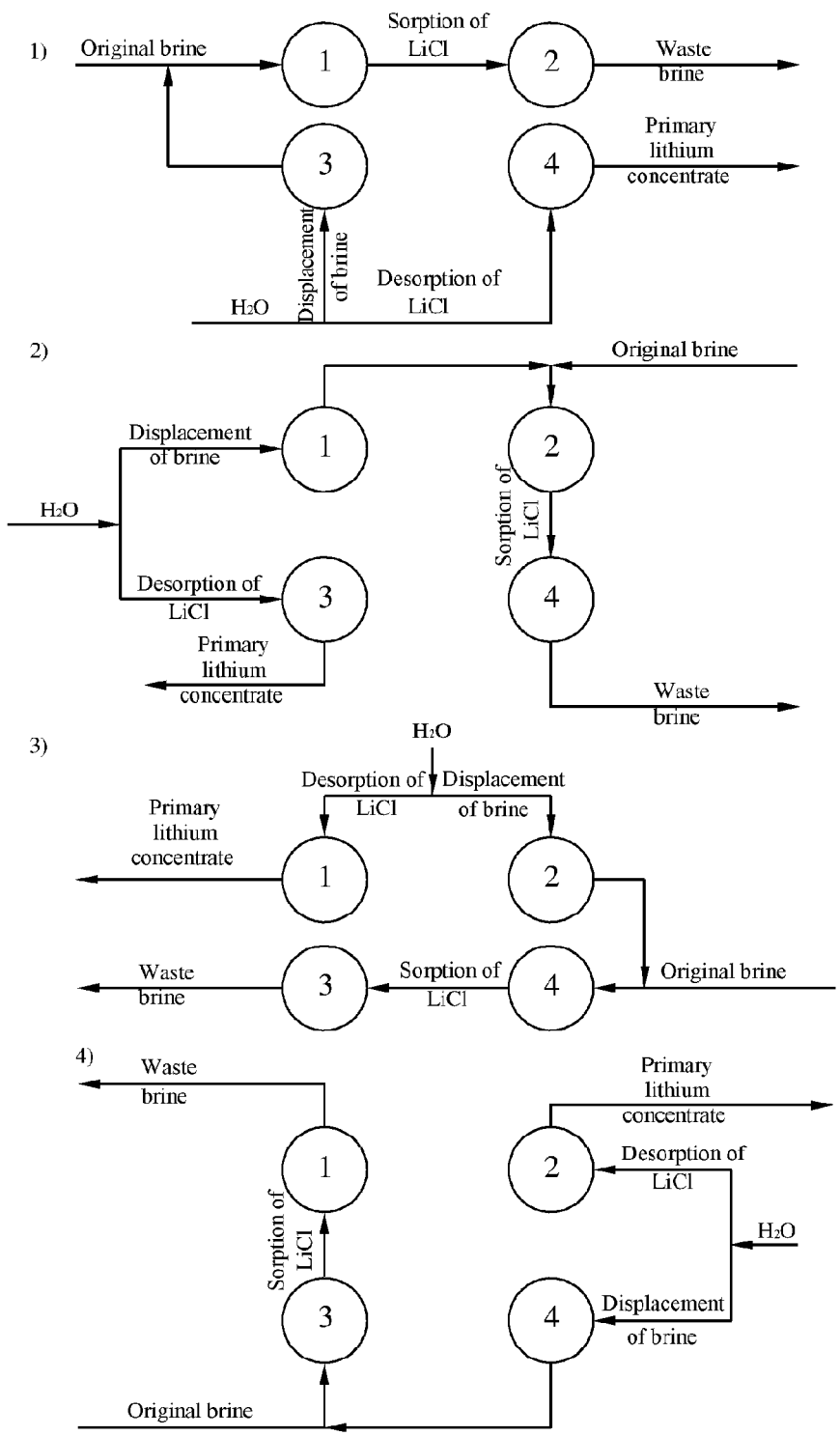

Remark: the following abbreviations are used on flow charts 1, 3, 4: DGAL-Cl—granulated sorbent based on the chlorine-containing form of double aluminum lithium hydroxide; WL—washing liquid.

The description of implementation of the proposed method is given below.

In accordance with the flow chart (FIG. 1), obtaining of primary lithium concentrate from the lithium bearing natural brine and processing thereof into anhydrous lithium chloride are performed as follows. Original natural brine passes the stage of purification from mechanical admixtures. If the content of mechanical admixtures is 1.0 kg/m³ and higher, the brine is first subjected to sedimentation centrifugation, then to fine filtering. Waste filtering elements are regenerated with the stream of filtered brine countercurrent to the direction of brine stream during filtration purification. Waste brine from the filtering elements regeneration stage is mixed with the original natural brine being transported for centrifugation.

The brine purified from the mechanical admixtures if first directed to recuperation heating with the stream of brine waste with respect to lithium which passed the limit of sorption concentration, then to heating by recycling the process heat released during the stages of evaporation and cooling, wherein the natural brine is used as a coolant.

Heated brine comes into sorption-desorption unit for selective two-step lithium chloride sorption by the DGAL-C1 granulated sorbent. At the first sorption step brine stream comes into contact with partially saturated sorbent thereby completely saturating the latter over the time period allowed for the sorption stage. At the same time at the second sorption step brine stream separated from lithium chloride by 45-55% comes into contact with the original (fresh) sorbent, wherein it is separated from lithium chloride by 45-55% more, partially saturating the sorbent. The brine that was subjected to the sorption stage (mother brine) is subjected to filtration in order to capture the small sorbent fraction carried out from the columns. First step sorbent saturated with lithium chloride is separated from the brine by first draining it from the column and directing the drained volume back to sorption, and then by stepwise successive washing with five volumes of washing liquid, four of which comprise the washing liquid with various content of brine components which decreases with each step of washing, and the fifth portion is fresh water. The first portion of washing liquid (WL-1) is used to fill the column separated from the brine and is displaced from the column with the second portion of the washing liquid (WL-2). Directing the displaced volume to mixing with the natural lithium-bearing brine heated and purified from suspended solids, the second portion of the washing liquid is displaced from the column with the third portion of the washing liquid (WL-3) and is used in the next cycle as WL-1, the third portion of the washing liquid is displaced from the column with the fourth washing liquid (WL-4) and is used in the next cycle as WL-2, the fourth portion of the washing liquid is displaced from the column with the fifth portion of the washing liquid (fresh water) and is used in the next cycle as WL-3, the fifth portion of the washing liquid is displaced from the column with the corresponding portion of the desorbing liquid (aqueous LiCl solution) and is used in the next cycle as WL-4. In the next cycle fresh portion of fresh water is used as the fifth portion of the washing liquid, this arrangement of brine removal from the column is optimal, because it provides sufficiently complete brine removal (above 98%) at the minimal amount of the washing steps equal to five. The predetermined amount of lithium chloride is desorbed from the sorbent that is washed from the brine and saturated with lithium chloride by filtering portions of desorbing liquids of predetermined volumes through the sorbent layer on the assumption that the first portion of the desorbing liquid, which is a diluted aqueous lithium chloride solution with admixed residual brine components, is removed from the process as the primary lithium concentrate after being brought into contact with the sorbent. After bringing the second portion of the desorbing liquid, which is fresh water, into contact with the sorbent, it is used as the first step desorbing liquid in the next cycle together with the volume of desorbing liquid displaced from the sorbent by the corresponding volume of lithium-bearing brine at the sorption stage of the next cycle. The scheme of the operating cycle of the sorption-desorption unit of four columns is shown in more detail on FIG. 2. The obtained primary lithium concentrate is filtered in order to capture the small sorbent fraction carried out from the sorption-desorption columns during desorption.

After filtration the primary lithium concentrate is subjected to concentration-desalination by reverse osmosis, producing on one hand lithium concentrate obtained by reverse osmosis with the total salt content of up to 60 kg/m³, and on the other hand—permeate (demineralized water with the total salt content of no more than 30 g/dm³), used in the process as washing, displacement and desorbing liquid, thereby lowering the consumption of fresh water. In turn, in the lithium concentrate obtained by reverse osmosis which is preliminarily mixed with the waste regenerate of ion exchange purification of the secondary lithium concentrate and washing carbonate solution from the stage of lithium carbonate precipitation, the calculated amount of lithium carbonate is repulped, the pulp is carbonized with carbon dioxide until all lithium carbonate is dissolved and converted into lithium bicarbonate solution according to the reaction:

$$Li_2CO_3 + CO_2 + H_2O \rightarrow 2LiHCO_3 \quad (1).$$

The obtained bicarbonate-chloride lithium-containing solution is concentrated to LiCl content of 190-200 kg/m³ by evaporation with simultaneous purification from calcium and magnesium, producing secondary lithium concentrate. At that in case natural solar concentration in the basins is used for evaporating the solution, the process of its natural evaporation is accompanied by gradual decomposition of lithium bicarbonate and conversion of calcium and magnesium ions into insoluble compounds with $CO_3^{2-}$ and $OH^-$ anions formed upon decomposition of $LiHCO_3$.

The process may be described by the following chemical reactions:

$$2LiHCO_3 \rightarrow Li_2CO_3 + H_2O + CO_2\uparrow \quad (2),$$

$$Li_2CO_3 + H_2O \rightarrow LiHCO_3 + LiOH \quad (3),$$

$$Ca^{2+} + CO_3^{2-} \rightarrow CaCO_3\downarrow \quad (4),$$

$$4Mg^{2+} + 3CO_3^{2-} + 2OH^- + 3H_2O \rightarrow Mg(OH)_2 \cdot 3MgCO_3 \cdot 3H_2O\downarrow \quad (5).$$

If it is not possible to use natural solar concentration, the chloride-bicarbonate lithium-containing solution is first heated under intense stirring and at an underpressure of 0.5 atm to a temperature of 85° C., carrying out decarbonization and precipitating calcium and magnesium into insoluble compounds $CaCO_3$ and $Mg(OH)_2 \cdot 3MgCO_3 \cdot 3H_2O$. Complete decarbonization process takes 45-60 minutes. After decarbonization is complete and the admixtures are precipitated, the solution after being acidified is evaporated to obtain secondary lithium concentrate and condensate of secondary steam.

After mixing the obtained secondary lithium concentrate with the concentrated LiCl solution obtained upon processing the mother liquor from the lithium carbonate precipitation stage, it is directed to reagent purification from calcium, magnesium and sulfate ions due to increased admixtures content upon evaporation of the secondary lithium concentrate. Reagent purification is performed on the basis of two possible alternatives. According to the first alternative $BaCl_2$ is used as a reagent for precipitating barium, and the calculated amount of $Na_2CO_3$ is used as a reagent for purification from calcium and magnesium.

The purification process may be described by the following chemical equations:

$$Ba^{2+} + SO_4^{2-} \rightarrow BaSO_4\downarrow \quad (6),$$

$$CaCl_2 + Na_2CO_3 \rightarrow CaCO_3\downarrow + 2NaCl \quad (7),$$

$$Na_2CO_3 + H_2O \rightarrow NaOH + NaHCO_3 \quad (8),$$

$$4MgCl_2 + 3Na_2CO_3 + 2NaOH + 3H_2O \rightarrow Mg(OH)_2 \cdot 3MgCO_3 \cdot 3H_2O + 8NaCl \quad (9).$$

According to the second alternative Ba(OH)$_2$ is used as a reagent for purification of the secondary lithium concentrate from sulfate ions, and the solution of LiHCO$_3$, obtained by carbonizing the pulp, prepared from the calculated amounts of lithium carbonate and washing carbonate solution, with carbon dioxide, is used as a reagent for purification from calcium and magnesium. This alternative of the purification process may be described by the following chemical equations:

$$Ba(OH)_2 \rightarrow Ba^{2+} + 2OH^- \quad (10),$$

$$Ba^{2+} + SO_4^{2-} \rightarrow BaSO_4 \downarrow \quad (11),$$

$$HCO_3^- + OH^- \rightarrow CO_3^{2-} + H_2O \quad (12),$$

$$Ca^{2+} + CO_3^{2-} \rightarrow CaCO_3 \downarrow \quad (13),$$

$$4Mg^{2+} + 3CO_3^{2-} + 2OH^- + 3H_2O \rightarrow Mg(OH)_2 \cdot 3MgCO_3 \cdot 3H_2O \downarrow \quad (14).$$

The viability of a particular alternative of purification is determined as the stage of plant engineering.

After filtering and separation from the solid precipitates phase the reagent purified secondary lithium concentrate, which is the lithium chloride solution, is divided into two predetermined streams, one of which is directed to Li$_2$CO$_3$ precipitation by getting into contact with the saturated Na$_2$CO$_3$ solution. The obtained Li$_2$CO$_3$ is used for purifying the primary lithium concentrate or purifying the lithium concentrate obtained by reverse osmosis from calcium and magnesium. The other stream of lithium chloride is directed to fine ion exchange purification from the residual content of calcium and magnesium on the Lewatit 208-TP ampholyte in the Li-form or analogues thereof.

The process of ion exchange purification is described by the following equations:

1) Sorption

(15)

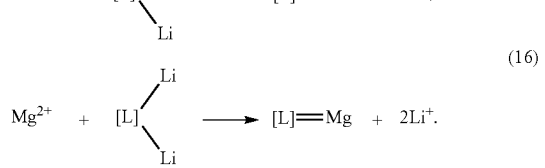
(16)

2) Regeneration

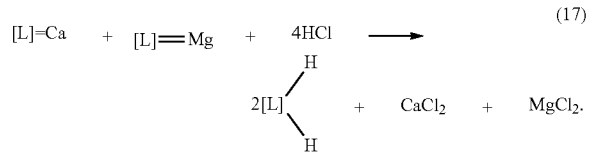
(17)

3) Conversion into the Li-Form

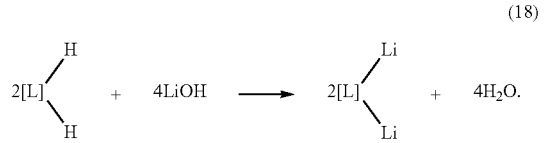
(18)

Conversion of the resin into the Li-form may also be performed using the LiHCO$_3$ solution instead of LiOH solution, according to the reaction:

(19)

Waste regenerating solution is directed to mixing with the lithium concentrate obtained by reverse osmosis for the preparation of the Li$_2$CO$_3$ pulp, carbonization and using for purifying the lithium concentrate obtained by reverse osmosis or the primary lithium concentrate from calcium and magnesium.

The stream of secondary lithium concentrate passed through fine purification from calcium and magnesium is evaporated to LiCl content of 485-490 kg/m$^3$, cooled to the room temperature, whereby NaCl and KCl are salted out from the solution to their residual total content of no more than 4 kg/m$^3$.

After separation of NaCl and KCl crystals from the LiCl solution the latter is evaporated, whereby lithium chloride monohydrate (LiCl.H$_2$O) is crystallized, the crystals formed are separated from the residual liquid phase by centrifugation. Centrate is directed back to evaporation, LiCl H$_2$O crystals are washed from the residual mother liquor with chloride-alkaline solution (1.0-1.5% by weight of LiOH in the saturated LiCl solution). Addition of LiOH into the LiCl solution allows conversion of the residual sodium and potassium admixtures contained in the solid phase of LiCl.H$_2$O crystalline hydrate into the washing solution. After being acidified, the waste washing solution containing sodium and potassium is directed to mixing with the secondary lithium concentrate finely purified from calcium and magnesium and to evaporation. The LiCl.H$_2$O crystals washed from the mother liquor are directed to two-stage drying. The drying is performed in the air flow. At the first stage the crystals of lithium chloride monohydrate are dried to a residual moisture content of 10-12% by weight at the drying zone temperature of 90° C. At the second stage the temperature of the drying zone is increased to 110° C., to obtain anhydrous LiCl with a residual moisture content of less than 4% by weight, that corresponds to the requirements of technical specification TU 95.1926-89. To avoid concentration of water vapors, the relative humidity of air at the outlet of the drying zones at both stages is maintained within 75-80° C. The NaCl and KCl crystals salted out during evaporation of the secondary lithium concentrate purified from the admixtures comprising the LiCl.H$_2$O crystals as an admixture, are washed with saturated chloride solution prepared from the mixture of NaCl and KCl crystals. Washed NaCl and KCl crystals are used as raw material for obtaining alkaline solution (NaOH and KOH), which in turn is used for obtaining carbonate solution (Na$_2$CO$_3$ and K$_2$CO$_3$). Lithium-containing waste washing solution formed upon washing the NaCl and KCl crystals is directed to mixing with the purified secondary lithium concentrate and to evaporation. The mother liquor from the stage of lithium carbonate precipitation, which is the NaCl solution with concentration of 220-230 kg/m$^3$ with admixed KCl (the content is 2 kg/m$^3$) and Li$_2$CO$_3$ (the content is 11-12 kg/m$^3$), is in turn acidified, decarbonized and evaporated, salting out the NaCl and KCl crystals to obtain LiCl concentration in the evaporated solution of 485-490 kg/m³.

After separation from the NaCl and KCl crystals the lithium-containing liquid phase is directed to mixing with the secondary lithium concentrate being transported to reagent purification from the admixtures. The NaCl and KCl crystals are washed from the mother liquor with the condensate of secondary steam, mixed with the NaCl and KCl crystals recovered upon evaporation of the stream of the secondary lithium concentrate finely purified from calcium and magnesium, which is directed to obtaining commercial lithium chloride, the mixture of crystals is dissolved in the condensate of secondary steam, forming aqueous NaCl solution with admixed KCl with the total salt content of 260-270 kg/m³. The solution is finely purified from the calcium and magnesium admixture by ion exchange method on the Lewatit 208-TP resin in the Na-form and is directed to electromembrane process to obtain NaOH solution (catholyte) and anodic chlorine gas. Catholyte is carbonized with the effluent furnace gas, producing the saturated $Na_2CO_3$ solution, in accordance with the reaction:

$$CO_2 + 2NaOH \rightarrow Na_2CO_3 + H_2O \quad (20).$$

Soda ash solution is used as the precipitating reagent for obtaining the predetermined amount of $Li_2CO_3$. Furnace gas is a waste product of the process of producing heating steam in a waste-heat boiler upon burning the gaseous mixture consisting of the natural gas and hydrogen. Gaseous mixture is obtained by entraining cathodic hydrogen from the gas separator of the catholyte circuit of the electromembrane device with the stream of the original natural gas. Anodic chlorine is converted into 3.0N-3.5N hydrochloric acid solution by entraining anodic chlorine from gas separator of the anolyte circuit of the electromembrane device with the stream of aqueous carbamide solution followed by absorption, accompanied by the following chemical reaction:

$$3Cl_2 + (NH_2)_2CO + H_2O \rightarrow 6HCl + N_2\uparrow + CO_2\uparrow \quad (21).$$

Hydrochloric acid solution is used for regeneration of ion exchange resin, acidifying and decarbonizing the solutions before evaporation, and for other purposes of the production process.

The technical process of preparing the primary lithium concentrate and processing thereof into technical-grade lithium carbonate (FIG. 3) differs from the technical process of preparing the primary lithium concentrate and processing thereof into anhydrous lithium chloride only in that the whole stream of prepared and purified from the calcium and magnesium admixtures secondary lithium concentrate is processed into $Li_2CO_3$ following the same scheme.

The technical process of preparing the primary lithium concentrate and processing thereof into battery-grade lithium carbonate is presented on FIG. 4. The main differences between this technical process and the technical process of preparing technical-grade lithium carbonate (FIG. 3) consist in that the stream of the secondary lithium concentrate, reagent-purified from the calcium and magnesium admixtures, is subjected to fine ion exchange purification on the Lewatit 208-TP ampholyte in the Li-form or analogues thereof, and precipitation of lithium carbonate from the secondary lithium concentrate finely purified from the admixtures is performed by using ammonium carbonate according to the reaction:

$$2LiCl + (NH_4)_2CO_3 \rightarrow Li_2CO_3 + 2NH_4Cl \quad (22).$$

At that the mother liquor from the precipitation stage, which is an aqueous $NH_4Cl$ solution with little admixed NaCl and KCl after acidifying, is evaporated, salting out $NH_4Cl$, to the level of LiCl content of 485-490 kg/m³. After separation of the crystals the liquid phase is directed to mixing with the secondary lithium concentrate before ion exchange purification thereof, and the $NH_4Cl$ crystals with admixtures are reacted with the CaO or CaO pulp with admixed MgO prepared by decomposition of the $CaCO_3$ precipitate with admixed $3MgCO_3 \cdot Mg(OH)_2 \cdot 3H_2O$ or limestone and dolomite according to the reaction:

$$CaCO_3 \xrightarrow{t=850°C} CaO + CO_2\uparrow, \quad (23)$$

$$CaCO_3 + MgCO_3 \xrightarrow{t=850°C} CaO + MgO + 2CO_2\uparrow. \quad (24)$$

The reaction between $NH_4Cl$ and CaO in the presence of water proceeds with release of heat (Q) and is accompanied by intense distillation of ammonia in accordance with the exothermic reaction:

$$2NH_4Cl + CaO \rightarrow 2NH_3\uparrow + CaCl_2 + H_2O + Q \quad (25).$$

Gaseous mixture of ammonia and carbon dioxide prepared upon preparation of CaO is, in turn, absorbed by water upon cooling in the countercurrent mode, to obtain concentrated $(NH_4)_2CO_3$ solution according to the reaction:

$$2NH_3 + CO_2 + H_2O \rightarrow (NH_4)_2CO_3 \quad (26).$$

Thus obtained $(NH_4)_2CO_3$ solution is used for precipitating $Li_2CO_3$ from the secondary lithium concentrate finely purified from the admixtures (reaction 22).

Mother suspension formed at the stage of $NH_4Cl$ decomposition with limestone and distillation of $NH_3$ is centrifuged, separating the solid MgO phase with admixed $SiO_2$ and $Fe_2O_3$ from the liquid phase. Liquid phase which is a $CaCl_2$ solution of 250-270 kg/m³ with little 2-4 kg/m³ admixture of NaCl and KCl is used either in municipal services as an anti-dust reagent and deicing reagent, or as a reagent for lowering the sulfate ions content of the original natural brine, if the brine is characterized by a higher content of sulfate ions.

Because the content of sodium and potassium chlorides in the secondary lithium concentrate finely purified from calcium and magnesium is within 2-4 kg/m3, after the precipitated lithium carbonate is washed from the mother liquor, the total concentration of sodium and potassium in the finished product is less than 0.002% by weight. The main admixture in the washed $Li_2CO_3$ is $NH_4Cl$. However, during the process of drying of the wet lithium carbonate $NH_4Cl$ is hydrolyzed to ultimately form volatile products $NH_3$ and HCl in accordance with the chemical equation:

$$NH_4Cl + H_2O \xrightarrow{t=80-90°C} NH_4OH + HCl\uparrow. \quad (27)$$

$$NH_4OH \xrightarrow{t \leq 20°C} NH_3\uparrow + H_2O. \quad (28)$$

Thus the proposed production process (FIG. 4) allows, given that the limestone or dolomite deposit is available, to produce battery-grade lithium carbonate from multicomponent lithium-bearing natural brines, simultaneously lowering the cost of production by replacing the expensive soda ash with cheaper limestone or dolomite reagents.

Proposed invention will now be illustrated by the specific examples.

Example 1

Natural seepage lithium-bearing brine with a density of 1215 g/dm3, pH=6.2, material composition (g/dm$^3$): LiCl—1.16; NaCl—53.5; KCl—21.3; CaCl$_2$—182.3; MgCl$_2$—47.2; Br$^-$—4.0; Fe$_{total}$—0.01; suspended solids—4.3; total salt content of 305.4 g/dm$^3$, was subjected to centrifugation on the laboratory sedimentation centrifuge, centrate was separated from the solid precipitate phase. Centrate was analyzed for the residual content of suspended solids and filtered through fine textile filter. Filtrate was analyzed for the content of suspended solids. Suspended solids captured on the filter were washed with the countercurrent stream of a mixture of filtrate and air (regenerate). Waste regenerate was analyzed for the content of suspended solids. Obtained results are presented in Table 1.

It follows from the contents of the table that the combined purification of the natural brine from the suspended solids (centrifugation+filtration) provides the degree of purification at the level of 99.9%. At that no more than 5% of the volume of the filtered brine is required for regeneration of the filter, providing the concentration of suspended solids in the stream of waste regenerate that is close to the content of suspended solids in the original brine.

TABLE 1

| Content of suspended solids in the original brine, g/dm$^3$ | Volume of the original brine subjected to centrifugation, dm$^3$ | Residual content of the suspended solids in the centrate, g/dm$^3$ | Residual content of the suspended solids in the centrate filtrate, g/dm$^3$ | Volume of the filtrate used for filter regeneration, dm$^3$ | Concentration of suspended solids in the waste regenerate, g/dm$^3$ |
|---|---|---|---|---|---|
| 4.36 | 2.17 | 0.24 | Less than 0.005 | 0.13 | 3.95 |

Example 2

Comparative tests using natural stratal lithium-bearing brine of the Znamenskoye deposit in the Irkutsk region purified from suspended solids and iron, were conducted on the laboratory bench represented by sorption-decorption units of two columns (prototype) and four columns (proposed unit, FIG. 4). Brine composition (g/dm$^3$): LiCl—2.5; NaCl—6.1; KCl—8.2; CaCl$_2$-330; MgCl$_2$—115; Br$^-$—10.1; total salt content of 472 g/dm$^3$, pH value of 4.2. 28.2 dm$^3$ of the original brine was passed through each of the units: through one column with the sorbent that was subjected to regeneration stage in the prototype, successively through two columns in the proposed unit (the first column in the direction of the movement of the brine stream had partially saturated sorbent, the second column had the sorbent that was subjected to regeneration stage). Comparative tests results are presented in Table 2.

It unambiguously follows from the contents of Table 2 that the recovery ratio in the proposed sorption-desorption unit is more than 1.6 times higher than in the prototype unit. Furthermore, the degree of sorbent saturation with lithium chloride in the frontal column (the column changing over to stages of brine removal and regeneration) in the proposed unit is 10% higher than in the prototype.

TABLE 2

| Structure of sorption-desorption unit | Volume of the brine passed through, dm$^3$ | Volume of the sorbent in the column, dm$^3$ | LiCl recovery ratio from the brine, % | Mean LiCl content in the sorbent of the frontal column, g/dm$^3$ |
|---|---|---|---|---|
| Prototype | 28.2 | 3.7 | 56.1 | 1.76 |
| Proposed | 28.2 | 3.7 | 93.0 | 1.95 |

Example 3

Comparative tests were conducted on the pilot unit consisting of two identical sorption-desorption columns prepared for the stage of brine removal, loaded with 3.7 dm$^3$ of the granulated DGAL-C1 sorbent each, using the following procedure.

10 dm$^3$ of the displacement liquid (aqueous LiCl solution with concentration of 6 g/dm$^3$) was pumped into column No. 1 in the direction of the movement of the displacement liquid stream through the column section downwards from the top. Displacement liquid of the same volume was pumped into column No. 2 with similar pump in the upward direction. Initial flow rate of the displacement liquid through both columns was set at the level of 0.2 dm$^3$/min. By the end of the experiment the flow rate through the column No. 1 lowered to 0.08 dm$^3$/min, while the flow rate through the column No. 2 remained constant during the whole experiment. At that 10 dm$^3$ of the displacement liquid passed through the column No. 1 within 77 minutes, while the same volume of the displacement liquid passed through the column No. 2 within 50 minutes. Obtained results unambiguously indicate that displacing brine from the sorbent layer in the direction downwards from the top leads to compaction of the granular layer and significant increase in its resistance to the displacement stream, which ultimately leads to increased pressure in the column at the same flow rate of the washing liquid. Then comparative tests were continued in the direction of finding out the impact of the direction of movement of the displacement liquid on the degree of washing from the brine. For this purpose desorption of LiCl from the sorbent separated from the brine in the columns No. 1 and No. 2 was performed. Upon desorption the following primary lithium concentrates were obtained. Concentrate from the column No. 1 (composition, g/dm$^3$): LiCl—5.3; residual brine—6.4. Concentrate from the column No. 2 (composition, g/dm$^3$): LiCl—5.1; residual brine—6.2. The experiment has shown that the degree of washing the sorbent from the brine virtually does not depend on the direction of movement of the displacement liquid through the sorbent layer. Thus by a set of two factors displacement of the brine in the upward direction is more preferred.

Example 4

The influence of the amount of steps of washing the sorbent from the brine in the column that was subjected to the sorption stage on the residual brine content in the obtained primary lithium concentrate was studied on a pilot bench including a sorption-desorption unit of four columns. The study was performed in a set mode, strictly following the sequence of the process stages presented on FIG. 1. Natural brine of the Znamenskoye deposit in the Irkutsk region (the composition is provided in Example 2) was used as the lithium-bearing brine. Load volume of the granulated sorbent in the columns of sorption-desorption unit was 3.7 dm$^3$. The volume of washing liquid on each of the washing steps was 1.1 dm$^3$. Obtained results are presented in Table 3.

The studies have shown that the optimal amount of steps in stepwise-countercurrent washing of the sorbent from the brine is five washing steps, because further increasing the amount of washing steps does not lead to significant increase in the purity of the obtained primary lithium concentrate, while the operational costs attributed to increase in the amount of washing steps do increase significantly. At the same time reducing the amount of washing steps leads to content of the brine components in the primary lithium concentrate increased by more than three times.

TABLE 3

| Amount of washing steps | Load volume of the sorbent into SDU columns, dm$^3$ | Volume of washing liquid on each step, dm$^3$ | Original brine composition, g/dm$^3$ | | Composition of the primary lithium concentrate produced | |
|---|---|---|---|---|---|---|
| | | | LiCl | the rest of the brine components in total | LiCl | the rest of the brine components in total |
| 3 | 3.7 | 1.1 | 2.5 | 469.5 | 6.0 | 77.2 |
| 4 | 3.7 | 1.1 | 2.5 | 469.5 | 5.9 | 23.7 |
| 5 | 3.7 | 1.1 | 2.5 | 469.5 | 6.1 | 6.9 |
| 6 | 3.7 | 1.1 | 2.5 | 469.5 | 6.0 | 6.4 |

Example 5

200 dm$^3$ of the natural lithium-bearing brine of the Znamenskoye deposit m the Irkutsk region (the composition is provided in Example 2) was processed on the experimental bench. The processing was performed following the flow charts presented on FIG. 1 and FIG. 2, producing anhydrous lithium chloride. At that the alternative of concentrating the primary lithium concentrate by reverse osmosis with purification of the lithium concentrate obtained by reverse osmosis from calcium and magnesium by thermal decomposition of lithium bicarbonate produced in the lithium concentrate obtained by reverse osmosis by carbonization of the lithium carbonate solid phase, preliminarily included into the lithium concentrate obtained by reverse osmosis, with carbon dioxide. To obtain lithium carbonate necessary for purification of the lithium concentrate obtained by reverse osmosis in this experiment, soda ash solution with a concentration of 300 g/dm$^3$ was used, obtained by dissolving commercial $Na_2CO_3$ in the demineralized water. Consequently 464.8 g of anhydrous lithium chloride was obtained, chemical composition thereof is presented in Table 4.

TABLE 4

| Substance (element, ion) | Content, % by weight |
|---|---|
| LiCl | 99.52 |
| (Na + K) | 0.03 |
| Ca | Less than 0.005 |
| Fe | Less than 0.001 |
| Al | Less than 0.005 |

TABLE 4-continued

| Substance (element, ion) | Content, % by weight |
|---|---|
| Si | Less than 0.002 |
| OH$^-$ | 0.01 |
| $SO_4^{2-}$ | 0.04 |
| Pb | Less than 0.003 |
| $SO_4$ | Less than 0.005 |
| $H_2O$ | 0.2 |

Furthermore, during the preparation of LiCl from the primary lithium concentrate, the following was produced as byproducts: NaCl—644.9 g (641.1 g from the mother liquor from the lithium carbonate precipitation stage, 3.8 g from the secondary lithium concentrate deeply purified from calcium and magnesium); KCl—10.6 g, comprising LiCl as an admixture in the amount of 0.02% by weight, i. e. 0.13 g.

Example 6

Crystals of NaCl+KCl with admixed LiCl were dissolved in the demineralized water bringing the total salt content of the solution to 262 g/dm$^3$ (solution volume being 11 dm$^3$). The solution was subjected to electromembrane process on the laboratory electrolysis cell (CTIEM-1 membrane, current density 2 kA/m$^2$) in the circulation-withdrawal mode of catholyte movement and circulation-supplying mode of anolyte movement (alkali metal chlorides solution). Upon processing 2.73 dm$^3$ of alkaline solution was obtained, comprising (g/dm$^3$): NaOH—160.57; KOH—2.92; LiOH—0.03. The solution was brought into contact with effluent furnace gases of the gas burner in which the propane-butane mixture was burned. Carbonization was stopped when the alkaline value of the carbonized solution changed over to a pH value of 10. After carbonization the volume of the solution decreased to 1.98 dm$^3$. The content of alkali metal carbonates was as follows (g/dm$^3$): $Na_2CO_3$—293.23; $K_2CO_3$—4.93; $Li_2CO_3$—0.05. Obtained solution having the temperature of 75.4° C. was brought into contact with the LiCl solution having the concentration of 196 g/dm$^3$ and the volume of 2.41 dm$^3$. The yield of $Li_2CO_3$ in the solid phase was 365.3 at the $Li_2CO_3$ content in the mother liquor of 11.2 g/dm$^3$. It unambiguously follows from the obtained results that chloride crystals recovered from the mother chloride solution formed after precipitating $Li_2CO_3$ from the secondary lithium concentrate may be processed into carbonate $Na_2CO_3$ solution comprising $K_2CO_3$ and $Li_2CO_3$, which is also an effective agent for precipitating $Li_2CO_3$ from the LiCl solution.

Example 7

700 dm$^3$ of the natural lithium-bearing brine of magnesium chloride type from the Qinghai provence (Gaermu, China) was processed on the experimental bench, the brine having the following composition, g/dm$^3$: LiCl—2.75; NaCl—23.1; KCl—19.1; $MgCl_2$—349.2; $B_4O_7$—1.2; $SO_4$—2.3; Fe—0.003; density—1280 g/dm$^3$, pH value—6; total salt content of 401 g/dm$^3$, strictly following the flow chart presented on FIG. 3.

The brine was processed in batches of 50 dm$^3$ each. Mean lithium recovery ratio from the brine was 90%. 14 samples of lithium carbonate were obtained, a total of 1507.9 g. Chemical analysis has shown that the composition of the obtained product was stable. Analysis results are presented in Table 6.

TABLE 6

| Component analyzed | Content of the component, % by weight | |
|---|---|---|
| | typical product | best product |
| $Li_2CO_3$ | 99.6 | 99.7 |
| Na | 0.0250 | 0.0230 |
| Cl | 0.0080 | 0.0040 |
| Ca | 0.0290 | 0.0040 |
| Mg | 0.0040 | 0.0024 |
| $SO_4$ | 0.0100 | 0.007 |
| K | 0.0030 | 0.0021 |
| loss of ignition (200° C.) | 0.0960 | 0.0622 |
| insoluble precipitate (HCl) | 0.1550 | 0.0950 |
| Fe | 0.0004 | 0.0003 |

It follows from the obtained results that the purity of the lithium carbonate obtained from the natural lithium-bearing brine using the proposed process (the scheme on FIG. 3) is significantly higher than 99%, and the prepared product corresponds to the requirements of the global market with respect to technical-grade $Li_2CO_3$.

Example 8

600 dm³ of the natural lithium-bearing brine of the Znamenskoye deposit in the Irkutsk region (the composition is provided in Example 2) was processed on the experimental bench following the flow chart presented on FIG. 4. The brine was processed in batches of 50 dm³ each. Mean LiCl recovery ratio from the brine was 93%. Slaked lime from PAO "Krasnoyarskiy khimiko-metallurgicheskiy zavod" was used for decomposition of $NH_4Cl$ salt. Balloon carbon dioxide was used to obtain the absorbed mixture of $NH_3$:$Cl_2$=2:1. Mean value of the recovery ratio of the ammonium salt was 99.2%. Limestone decomposition was not carried out because practical implementation of this process is obvious. 12 samples of lithium carbonate were obtained. A quarter of weight was taken from each sample and thoroughly mixed. Representative samples were taken from the obtained mixture and analyzed for the content of the main substance and admixtures, the content of which is limited by the requirements for battery-grade lithium carbonate. Obtained results are shown in Table 7.

It follows from the contents of the table that the purity of lithium carbonate obtained from natural lithium-bearing brine using the proposed technology (the scheme on FIG. 4) is higher than 99.8%, and the prepared product corresponds to the requirements of the global market for battery-grade $Li_2CO_3$.

CITED LITERATURE

1. Y. I. Ostroushko, T. V. Degtyareva Hydromineral raw material is a sustainable lithium source. Analytical review. Moscow, publ. by TSNIATOMINFORM, 1999, 64 p.
2. U.S. Pat. No. 4,243,392 Process for solar concentration of lithium chloride brines/P. M. Brown, et. al. Filed on 23 Jul. 1981.
3. U.S. Pat. No. 4,274,834 Process for purification of lithium chloride/P. M. Brown, et. al. Filed on 23 Jul. 1984.
4. U.S. Pat. No. 4,271,131 Production of highly pure lithium chloride/P. M. Brown et. Al. Filed on 2 Jun. 1981.
5. U.S. Pat. No. 5,219,550 Production of low boron lithium carbonate from lithium containing brine/P. M. Brown, D. A. Boryta. Publ. on 1993.
6. U.S. Pat. No. 6,207,126 Recovery of lithium compounds from brines/D. A. Boryta, T. F. Kullberg, A. M. Nhurston. Filed on 2001.
7. U.S. Pat. No. 4,159,311 Recovery of lithium from brines/J. M. Lee, W. C Bauman. Appl. 26 Jun. 1979.
8. U.S. Pat. No. 4,221,767 Recovery of lithium from brines/J. M. Lee, W. C. Bauman. Appl. 9 Sep. 1980.
9. U.S. Pat. No. 4,347,327 Recovery of lithium from brines/J. M. Lee, W. C. Bauman. Appl. 19 Nov. 1979. Publ. on 31 Aug. 1982.
10. U.S. Pat. No. 4,477,367 Recovery of lithium from brines/J. L. Burba. October 1984.
11. U.S. Pat. No. 5,389,349 Recovery of lithium values from brines/W. C. Bauman, J. L. Burba. Filed on 24 May 1990. Publ. on 14 Feb. 1995.
12. U.S. Pat. No. 5,599,516 Recovery of lithium values from brines/W. C. Bauman, J. L. Burba. Filed on 13 Feb. 1995. Publ. on 4 Feb. 1997.
13. N. P. Kotsupalo, A A. D. Ryabtsev Chemistry and technology of obtaining lithium compounds from lithium-bearing hydromineral raw material, publ. by Geo, Novosibirsk, 2008, 291 p.
14. PCT/DE 01/04062 Method for obtaining granulated sorbent for lithium recovery from the brines and a plant for implementation thereof/A. D. Ryabtsev, N. P. Kotsupalo, L. T. Menzheres et. al. Filed on 25 Oct. 2001.
15. Pat. RU2223142 Method for obtaining sorbent for recovery of lithium from the brine/L. T. Menzheres, A. D. Ryabtsev, E. V. Mamylova et. al. Publ. on 10 Feb. 2004. Bull. No 23.

TABLE 7

| $Li_2CO_3$ content, % by weight | Admixture content, % by weight. | | | | | | | | | | | | |
|---|---|---|---|---|---|---|---|---|---|---|---|---|---|
| | Na | Mg | Ca | K | Fe | Zn | Cu | Pb | Si | Al | Mn | Ni | $SO_4^{2-}$ | $Cl^-$ |
| more than 99.8 | less than 0.001 | less than 0.002 | less than 0.002 | less than 0.001 | less than 0.0005 | less than 0.0003 | less than 0.0003 | less than 0.001 | less than 0.0003 | less than 0.001 | less than 0.001 | 0.0005 | less than 0.01 | 0.001 |

16. Pat. RU2455063 Method for producing granulated sorbent for lithium recovery from the brine/A. D. Ryabtsev, V. I. Titarenko, N. P. Kotsupalo et. al. A decision on patent grant of 27 Feb. 2012.
17. PCT/DE 01/04061 Method for obtaining lithium chloride from solutions and a plant for implementation thereof/A. D. Ryabtsev, L. T. Menzheres, V. I. Titarenko et. al. Filed on 25 Oct. 2001.
18. Pat. RU2516538 Method for obtaining lithium concentrate from lithium-bearing natural brines and processing thereof (prototype).

What is claimed is:

1. A method for preparing a lithium concentrate from lithium-bearing brine, comprising:
   1) sorption of lithium chloride from lithium-bearing brine using a sorption-desorption unit, the unit comprising granulated sorbent,
   2) washing the sorbent saturated with lithium chloride from the brine,
   3) desorption of the lithium chloride from the sorbent to obtain primary lithium concentrate, wherein:
   the sorption-desorption unit consists of four columns each filled with the granulated sorbent, wherein two columns are at the stage of lithium chloride sorption from the brine, one column is at the stage of washing the lithium chloride saturated sorbent from the brine, and one column is at the stage of lithium chloride desorption from the sorbent washed from the brine,
   wherein a stream of the brine is always first passed through the column with the sorbent partially saturated with lithium chloride the first sorption step,
   then the stream of the brine is passed through the column with the sorbent, which column has passed the stage of lithium chloride desorption from the sorbent, the second sorption step,
   wherein after the sorbent is completely saturated with lithium chloride in the first column (in the direction of the brine stream), this column is changed over to the stage of washing the sorbent from the brine,
   the column that was at the stage of washing the sorbent from the brine is changed over to the stage of lithium chloride desorption from the saturated sorbent,
   the column that was at the stage of lithium chloride desorption from the saturated sorbent is changed over to the stage of sorption as a column of the sorption second step, and
   the column that was at the stage of sorption as a column of the second sorption step is changed over to the stage of sorption as a column of the first sorption step,
   then the cycle is repeated.

2. The method of claim 1, wherein the lithium-bearing brine prior to step 1) is subjected to:
   sedimentation centrifugation of the brine to obtain a centrate and the centrate is then filtered by filters, or
   filtration by filters to obtain lithium-bearing brine purified from suspended solids.

3. The method of claim 2, wherein the filters are regenerated by back washing with the stream of filtered brine followed by sedimentation centrifugation of the stream of waste regenerating brine with removal of the precipitate and feeding the centrate to the stage of filtering of the original lithium-bearing brine, if the suspended solids in the original brine are in the amount of less than 1.0 kg/m$^3$.

4. The method of claim 1, wherein the lithium-bearing brine at step 1) is filtered (passed) through the layer of granulated sorbent in the upward direction to obtain granulated sorbent saturated with lithium chloride.

5. The method of claim 1, wherein the granulated sorbent is $LiCl.2Al(OH)_3.mH_2O$ based sorbent with deficiency of LiCl, wherein m=3-5.

6. The method of claim 1, wherein the washing at step 2) is carried out by stepwise displacement of the brine from the layer of granulated sorbent with portions of displacement liquid of predetermined volume.

7. The method of claim 1, wherein the desorption at step 3) is carried out by stepwise filtering through the layer of granulated sorbent of portions of desorbing liquids, removing the portions of filtrate from the process as the primary lithium concentrate, which is a lithium chloride solution with admixture of components of the brine.

8. The method of claim 7, wherein the admixture of components of the brine is selected from calcium, magnesium, sodium, potassium, boron, sulfate ions.

9. The method of claim 1, further comprising a step of purification of the primary lithium concentrate from calcium and magnesium admixtures by precipitating them in the form of insoluble $CaCO_3$ and $Mg(OH)_2.3MgCO_3.3H_2O$ salts.

10. The method of claim 1, wherein the linear velocity of the liquid phases in the columns on all stages of producing the primary lithium concentrate is maintained at the level of 5-7 m/h, the sorbent is washed from the brine by preliminary draining the brine from the column, then stepwise washing the sorbent successively with five portions of washing liquid in the upward direction, each having ⅓ of the volume of the sorbent in the column, wherein four portions out of five are the washing liquids with various content of brine components which decreases with each step of washing, and the fifth portion is the volume of fresh water, wherein the first portion of the washing liquid is used to fill the column and then it is displaced from the column with the second portion of the washing liquid, directing the displaced volume to mixing with the lithium-bearing brine purified from suspended solids, the second portion of the washing liquid is displaced from the column with the third portion of the washing liquid and is used in the next washing cycle as the first portion of the washing liquid, the third portion of the washing liquid is displaced from the column with the fourth portion of the washing liquid and is used in the next cycle as the second portion of the washing liquid, the fourth portion of the washing liquid is displaced with the fifth portion of the washing liquid and is used in the next cycle as the third portion of the washing liquid, the fifth portion of the washing liquid is displaced from the column with the corresponding portion of the desorbing liquid and is used in the next cycle as the fourth portion of the washing liquid, in the next cycle fresh portion of fresh water is used as the fifth portion of the washing liquid, desorption of lithium chloride from the sorbent washed from the brine is carried out by successive stepwise filtering of predetermined volumes of the desorbing liquids through the sorbent layer in the column, on the assumption that after bringing the first volume of the desorbing liquid, which is a diluted aqueous lithium chloride solution with admixed residual brine components (first step desorbing liquid), into contact with the sorbent, it is removed from the process as the primary lithium concentrate, after bringing the second volume of the desorbing liquid, which is fresh water (second step desorbing liquid), into contact with the sorbent, it is used as the first step desorbing liquid of the desorption stage in the next cycle together with the volume of the desorbing liquid displaced from the column filled with sorbent by the corresponding volume of lithium-bearing brine at the sorption stage of the next cycle.

11. The method of claim 10, wherein the desorbing liquids are water with various content of lithium chloride.

12. The method of claim 1, further comprising steps:
concentration of the purified lithium concentrate or concentration-desalination of the purified lithium concentrate by reverse osmosis followed by thermal evaporation to salt out NaCl and KCl crystals;
separation of NaCl and KCl crystals;
dilution of the filtrate to LiCl content of 190-200 kg/m$^3$;
purification from calcium and magnesium admixtures to obtain secondary lithium concentrate.

13. The method of claim 1, further comprising:
solar concentration of the primary lithium concentrate with respect to lithium chloride in a evaporating basin with simultaneous purification from calcium and magnesium by preliminary splitting the primary lithium concentrate into two streams, in one of which a predetermined amount of lithium carbonate is repulped, carbonization of the pulp with carbon dioxide or $CO_2$ comprising gaseous mixture in the regime of pulp circulation until all lithium carbonate is dissolved, then mixing this stream with the other stream of primary lithium concentrate, directing the mixed solution into the evaporating basin for concentrating the liquid phase with respect to LiCl, decarbonization and gradual conversion of the soluble calcium and magnesium chlorides into insoluble compounds $CaCO_3$ and $Mg(OH)_2.3MgCO_3.3H_2O$, which are separated from the concentrated LiCl solution comprising NaCl and KCl as main admixtures to obtain secondary lithium concentrate;
repulping the predetermined amount of $Li_2CO_3$ in the stream of primary lithium concentrate obtained by concentration-desalination by reverse osmosis, carbonizing the pulp with carbon dioxide or $CO_2$ comprising gaseous mixture in the regime of pulp circulation until all lithium carbonate is dissolved, heating the solution to a temperature of 80-85° C. under vacuum treatment up to 0.5 atm, decarbonizing, directing the released carbon dioxide to the stage of carbonization of the pulp prepared from lithium carbonate and lithium concentrate obtained by reverse osmosis, and simultaneously converting $CaCl_2$ and $MgCl_2$ into insoluble $CaCO_3$ and $Mg(OH)_2.3MgCO_3.3H_2O$ precipitates, which are separated from the liquid phase, concentrating the liquid phase, which is an aqueous LiCl solution with admixed NaCl and KCl with respect to lithium chloride using electrodialysis or heating process, or a combination thereof, until LiCl solution with the concentration of 190-200 kg/m$^3$ to obtain secondary lithium concentrate.

14. A method for preparation a lithium chloride, comprising:
a) providing a lithium concentrate by the method according to claim 1;
b) dehydration of the lithium concentrate.

15. The method of claim 14, wherein the lithium concentrate is split into two streams, one stream of the lithium concentrate is first subjected to reagent purification from magnesium, calcium, sulfate and borate ions using barium hydroxide or oxide and carbon dioxide as reagents, then it is subjected to fine ion exchange purification from calcium and magnesium on a polyampholyte in the Li-form, concentration by evaporation to LiCl content of 485-490 kg/m$^3$ (lithium chloride brine), the obtained lithium chloride brine is cooled to room temperature, separate the precipitated NaCl and KCl crystals with admixed LiCl.H$_2$O crystals from the liquid phase, the crystals are washed stepwisely in the regime of repulping and squeezing with three portions of washing chloride brine, each having two times the volume of the portion of the crystals being washed, two of which portions are mixed chloride solutions (NaCl+KCl+LiCl) with content of LiCl decreasing with each portion, and the third portion is a mixed solution of alkali metal chlorides free of LiCl, after bringing the first portion of the washing chloride solution (waste washing liquid) into contact with the crystals it is directed to the stage of evaporation, preliminarily mixing it with the lithium concentrate purified from the admixtures, the other two portions of the washing chloride solution are used for successive stepwise washing of the next portion of crystals, fresh (the third) portion of chloride washing solution is prepared by dissolving sodium chloride or sodium chloride with admixed potassium chloride in demineralized water, the cooled and separated from the crystals lithium chloride brine with residual NaCl+KCl content of no more than 2 kg/m$^3$ is evaporated until LiCl is converted into solid phase of lithium chloride monohydrate crystalline hydrate, the residual mother liquor from the stage of lithium chloride brine evaporation and crystallization of LiCl.H$_2$O is separated from LiCl.H$_2$O crystalline hydrate and mixed with the purified lithium concentrate being transported for evaporation, lithium chloride monohydrate crystalline hydrate is washed from the residual mother liquor with a washing liquid comprising, in wt %: LiCl—99.0-98.5; LiOH—1.0-1.5, waste washing liquid is acidified with hydrochloric acid to a pH=6-7 and mixed with the purified lithium concentrate being transported for evaporation, washed crystals are processed from the residual alkalinity by bringing them into contact with the calculated amount of hydrochloric acid and dried until anhydrous lithium chloride is obtained by two-step air flow-drying, maintaining the temperature of the drying zone at 85-90° C. during the first step, 108-110° C. during the second step, the moisture content of the air flow at the outlet of the drying zone being 75-80%, the other stream of lithium concentrate is used for precipitating lithium carbonate therefrom upon bringing it into contact with the solution of sodium carbonate or the solution of sodium carbonate comprising potassium carbonate, precipitated lithium carbonate is separated from the mother liquor by centrifugation and is directed to repulping with the part of the stream of primary lithium concentrate or with the stream of lithium concentrate obtained by reverse osmosis, for subsequent carbonization, the mother liquor from the lithium carbonate precipitating stage is acidified to a pH=6.0-6.5, evaporated to obtain LiCl concentration in the liquid phase of 485-490 kg/m$^3$, liquid phase is separated from the salted out NaCl crystals with admixed KCl crystals and is mixed with the stream of lithium concentrate used for obtaining lithium chloride, NaCl crystals with admixed KCl crystals are washed from the mother liquor, mixed with the washed NaCl and KCl crystals that were salted out during evaporation of the stream of the lithium concentrate upon producing LiCl, dissolved in the calculated volume of demineralized water to obtain a solution of alkali metal chlorides with NaCl concentration of 250-260 kg/m$^3$, the solution is subjected to electromembrane process generating NaOH solution and hydrogen at the cathode and chlorine at the anode, generated hydrogen is mixed with the stream of natural gas, the gaseous mixture is burned to give heat energy for obtaining heating steam, which in turn is used as heating medium in evaporating lithium concentrates and mother chloride liquor from the $Li_2CO_3$ precipitating stage, the furnace gas comprising $CO_2$ is used for carbonizing the NaOH solution, converting it into $Na_2CO_3$ solution (carbonate solution) and using it as the precipitating reagent at the lithium carbonate precipitating stage, anodic chlorine is induced and absorbed by the stream of aqueous carbamide solution, thereby producing hydrochloric acid solution used for acidifying carbonate-containing solutions before evaporation thereof and for regeneration of the waste polyampholyte.

16. A method for preparation lithium carbonate, comprising:
   a) providing a lithium concentrate by the method according to claim 1;
   b) precipitation of the lithium carbonate.

17. The method of claim 16, wherein the lithium concentrate is further subjected to ion exchange purification from calcium and magnesium using a polyampholyte in the Li-form.

18. The method of claim 16, wherein precipitation is carried out by using saturated aqueous ammonium carbonate solution at room temperature, the lithium carbonate precipitate is separated from the ammonium chloride mother liquor, one part of the lithium carbonate precipitate is used to obtain lithium bicarbonate solution which is used for purification of the lithium concentrate obtained by reverse osmosis from calcium and magnesium, the other part of lithium carbonate is washed stepwisely in the regime of repulping and centrifugation with three portions of the washing solution, each having three times the volume of the portion of lithium carbonate being washed, at a temperature of 90-95° C., first with two portions of saturated lithium carbonate solution with the content of ammonium and chloride ions decreasing with each portion, and then with a portion of demineralized water, after bringing the first portion of the washing solution into contact with lithium carbonate it is directed to the stage of $Li_2CO_3$ pulp production and using it to purify of the primary lithium concentrate or the lithium concentrate obtained by reverse osmosis from calcium and magnesium, the other two portions of the washing solution are used for successive washing of the next portion of lithium carbonate, washed lithium carbonate crystals are subjected to microwave drying to obtain a residual moisture content of 0.2 wt %, ammonium chloride is salted out from the mother liquor from the lithium carbonate precipitating stage by evaporation, after separation from the mother liquor from the evaporation stage ammonium chloride is washed from the residual mother liquor, waste washing solution is directed to evaporation by mixing it with the mother liquor from the lithium precipitating stage, the mother liquor from the evaporation stage, which is 485-490 kg/m³ LiCl solution with admixed $NH_4Cl$, is in turn mixed with the lithium concentrate before its ion exchange purification using a polyampholyte in the Li-form, ammonium chloride washed from the mother liquor is decomposed by treating it with water pulp comprising CaO with admixed MgO, $SiO_2$ and $Fe_2O_3$, removing the released ammonia, mixing it with carbon dioxide at the ratio of 2:1 and absorbing the gaseous mixture by water upon cooling the liquid and gaseous phases in the stepwise countercurrent mode, removing the waste absorbent as saturated ammonium carbonate solution used for precipitating lithium carbonate, the pulp formed after the removal of ammonia is separated by filtration or centrifugation, the liquid phase of calcium chloride solution with admixed NaCl and KCl is removed from the process and used in municipal services during summer season as a reagent for consolidation of earth roads and as a deicing reagent during winter season, solid phase of MgO with admixed $SiO_2$ and $Fe_2O_3$ is used for the production of magnesium products, calcium oxide and carbon dioxide necessary for decomposition of ammonium chloride and production of $(NH_4)_2CO_3$ solution are obtained by thermal decomposition of the precipitate of $CaCO_3$ and $Mg(OH)_2.3MgCO_3.3H_2O$ salts formed at the stage of purifying the primary lithium concentrate or the lithium concentrate obtained by reverse osmosis from calcium and magnesium, mixed with comminuted natural limestone or dolomite.

19. The method of claim 16, wherein precipitation is carried out from the whole stream of the lithium concentrate by bringing it into contact, under stirring, with the sodium carbonate solution comprising potassium carbonate at a temperature of 90-95° C., whereby after separation from the mother liquor one part of lithium carbonate is precipitated and used to obtain lithium bicarbonate solution which is then used to purify the lithium concentrate obtained by reverse osmosis or the primary lithium concentrate from calcium and magnesium, the other (producing) part of lithium carbonate is washed stepwisely in the mode of repulping and centrifugation with three portions of washing solution each having three times the volume of the portion of lithium carbonate being washed at a temperature of 90-95° C., first with two portions of saturated lithium carbonate solution with the content of sodium and chloride ion decreasing with each portion, and then with a portion of demineralized water, after bringing the first portion of the washing solution into contact with lithium carbonate it is directed to the stage of $Li_2CO_3$ pulp production used for carbonization, converting the solid $Li_2CO_3$ phase into $LiHCO_3$ solution and using it for purification of the primary lithium concentrate or the lithium concentrate obtained by reverse osmosis from calcium and magnesium, the other two portions of the washing solution are used for successive stepwise washing of the next portion of lithium carbonate, washed lithium carbonate crystals are subjected to microwave drying to obtain a residual moisture content of 0.4 wt. %.

* * * * *